United States Patent
Otsubo et al.

(10) Patent No.: US 10,858,964 B2
(45) Date of Patent: Dec. 8, 2020

(54) VALVE TIMING ADJUSTING DEVICE

(71) Applicant: DENSO CORPORATION, Kariya (JP)

(72) Inventors: Makoto Otsubo, Nisshin (JP); Hiroki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/733,557

(22) Filed: Jan. 3, 2020

(65) Prior Publication Data
US 2020/0141284 A1 May 7, 2020

Related U.S. Application Data

(63) Continuation of application No. PCT/JP2018/023810, filed on Jun. 22, 2018.

(30) Foreign Application Priority Data

Jul. 7, 2017 (JP) .................. 2017-133971

(51) Int. Cl.
| | | |
|---|---|---|
| F01L 1/34 | (2006.01) | |
| F16H 1/32 | (2006.01) | |
| F01L 1/352 | (2006.01) | |
| F01L 1/047 | (2006.01) | |

(52) U.S. Cl.
CPC .............. F01L 1/34 (2013.01); F01L 1/352 (2013.01); F16H 1/32 (2013.01); F01L 2001/0476 (2013.01); F01L 2001/3521 (2013.01); F01L 2820/032 (2013.01)

(58) Field of Classification Search
CPC .............. F01L 1/352; F01L 2820/032; F01L 2001/3521; F01L 1/34
USPC .................. 123/90.15, 90.17, 90.11
See application file for complete search history.

(56) References Cited

U.S. PATENT DOCUMENTS

| | | | |
|---|---|---|---|
| 2005/0076867 A1* | 4/2005 | Tani ................... | F01L 13/0042 123/90.17 |
| 2015/0211392 A1 | 7/2015 | Otsubo et al. | |
| 2016/0123197 A1 | 5/2016 | Otsubo et al. | |

FOREIGN PATENT DOCUMENTS

| | | |
|---|---|---|
| JP | 2008-223552 | 9/2008 |
| JP | 2011-236877 | 11/2011 |
| JP | 2017-115602 | 6/2017 |

OTHER PUBLICATIONS

JP_2011236877, Nov. 2011, English Langauge Machine Translation.*

* cited by examiner

*Primary Examiner* — Patrick Hamo
*Assistant Examiner* — Wesley G Harris
(74) *Attorney, Agent, or Firm* — Nixon & Vanderhye P.C.

(57) ABSTRACT

A single-row planetary bearing includes a single row of spherical rolling elements between an outer ring and an inner ring. A planetary gear is supported by a thrust bearing portion and is radially supported by the outer ring. The planetary gear performs a planetary motion while engaging with a driving rotor and a driven rotor at an eccentric side to adjust a rotational phase between the driving rotor and the driven rotor. The thrust bearing portion supports the planetary gear that is tilting with respect to the revolution centerline. The planetary gear has a recessed portion opened toward the thrust bearing portion. When the rotational phase is adjusted to a specific phase, the recessed portion is positioned at an anti-eccentric side opposite to the eccentric side with respect to a rotation centerline of the planetary gear.

7 Claims, 17 Drawing Sheets

VALVE TIMING ADJUSTING DEVICE

CROSS REFERENCE TO RELATED APPLICATION

The present application is a continuation application of International Patent Application No. PCT/JP2018/023810 filed on Jun. 22, 2018, which designated the U.S. and claims the benefit of priority from Japanese Patent Application No. 2017-133971 filed on Jul. 7, 2017. The entire disclosures of all of the above applications are incorporated herein by reference.

TECHNICAL FIELD

The present disclosure relates to a valve timing adjusting device for an internal combustion engine.

BACKGROUND

Conventionally, a valve timing adjusting device is used for an internal combustion engine. According to a known example, a driving rotor and a driven rotor rotate in conjunction with a crankshaft and a camshaft of an internal combustion engine, respectively. A planetary gear eccentrically engages with the driving rotor and the driven rotor and provides a planetary motion to adjust rotational phases between the rotors.

SUMMARY

According to one aspect of the present disclosure, a driving rotor is configured to rotate about a revolution centerline in conjunction with the crankshaft. A driven rotor is coaxially connected with the camshaft and configured to rotate about the revolution centerline in conjunction with the camshaft, the driven rotor including a thrust bearing portion around a revolution centerline that is common to the revolution centerline of the driving rotor. A planetary bearing includes an outer ring, an inner ring, and spherical rolling elements interposed between the outer ring and the inner ring. A planetary gear is supported by the thrust bearing portion and the outer ring to be eccentric relative to the driving rotor and the driven rotor. The planetary gear is configured to perform a planetary motion while engaging with the driving rotor and the driven rotor at an eccentric side relative to the driving rotor and the driven rotor to adjust a rotational phase between the driving rotor and the driven rotor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
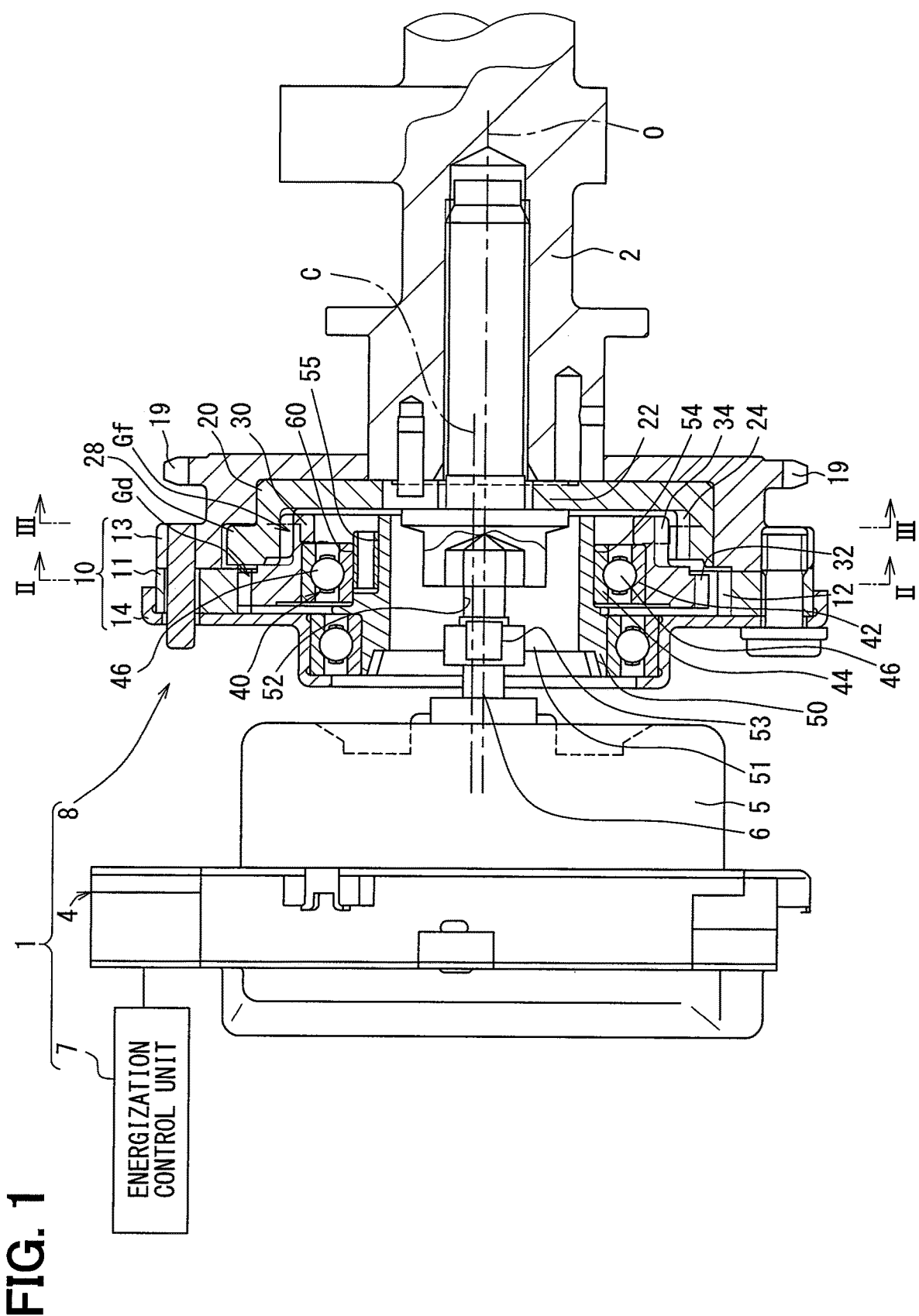
FIG. 1 is a partial cross sectional view taken along the line I-I of FIG. 2 and showing a valve timing adjusting device according to a first embodiment.

The description below explains an example of the present disclosure. A valve timing adjusting device according to the example of the present disclosure includes a single-row planetary bearing including a single row of spherical rolling elements interposed between an outer ring and an inner ring. The outer ring radially supports a planetary gear. The planetary gear radially supports the inner ring. In this example, the planetary gear engages with a driving rotor and a driven rotor at an eccentric side and is forced to perform a planetary motion by a planetary carrier. The planetary gear is supported by a thrust bearing portion of the driven rotor coaxially connected to a camshaft. Therefore, the planetary gear hardly tilts thereby to inhibit a noise at the engaging part.

However, the inventors found that the device according to the above-mentioned example could allow the planetary gear to hardly tilt against a revolution centerline common to the driving rotor and the driven rotor and adversely does not fully inhibit a noise. The reason is described below.

Concerning the device according to the above-described example, spherical rolling elements make rolling contact with an orbit plane in the outer ring of the planetary bearing. The orbit plane includes a tilt center point positioned at an eccentric side with respect to a rotation centerline. A planetary gear tends to tilt against the revolution centerline for the driving rotor and the driven rotor around the tilt center point. As a result, the planetary gear can tilt until making contact with the thrust bearing portion within a range of a clearance inevitably resulting from a manufacturing tolerance between the planetary gear and the thrust bearing portion.

When the planetary gear tilts to be adjacent to the thrust bearing portion at the eccentric side, a distance between an proximate location and the tilt center point shortens. It is made clear that the clearance at the engaging part can be decreased to inhibit a noise even when a tilt angle is caused to allow the planetary gear to make contact with the thrust bearing portion at the eccentric side.

Meanwhile, the planetary gear may tilt to be adjacent to the thrust bearing portion at an anti-eccentric side opposite to the eccentric side. In this case, a distance between an proximate location and the tilt center point elongates. It is made clear that the tilt angle allowing the planetary gear to make contact with the thrust bearing portion at the anti-eccentric side is too insufficient to decrease the clearance at the engaging part and inhibit a noise. In the latter case, the planetary gear makes contact with the thrust bearing portion at an insufficient tilt angle, easily causing a nose.

According to an example of the present application, a valve timing adjusting device is configured to be mounted to an internal combustion engine. The valve timing adjusting device is configured to transmit torque from a crankshaft to a camshaft and to adjust a valve timing at which the camshaft opens and closes a valve. The valve timing adjusting device includes a driving rotor configured to rotate about a revolution centerline in conjunction with the crankshaft. The valve timing adjusting device further includes a driven rotor coaxially connected with the camshaft and configured to rotate about the revolution centerline in conjunction with the camshaft. The driven rotor includes a thrust bearing portion around a revolution centerline that is common to the revolution centerline of the driving rotor. The valve timing adjusting device further includes a single-row planetary bearing including an outer ring, an inner ring, and a single row of spherical rolling elements interposed between the outer ring and the inner ring. The valve timing adjusting device further includes a planetary gear supported by the thrust bearing portion and radially supported by the outer ring to be eccentric relative to the driving rotor and the driven rotor. The planetary gear is configured to perform a planetary motion while engaging with the driving rotor and the driven rotor at an eccentric side relative to the driving rotor and the driven rotor to adjust a rotational phase between the driving rotor and the driven rotor. The valve timing adjusting device further includes a planetary carrier radially supporting the inner ring and configured to allow the planetary gear to perform the planetary motion. The thrust bearing portion is configured to support the planetary gear that is tilting with respect to the revolution centerline. The planetary gear has a recessed portion opened toward the thrust bearing portion. When the rotational phase is adjusted to a specific phase, the recessed portion is positioned at an anti-eccentric side opposite to the eccentric side with respect to a rotation centerline of the planetary gear.

The valve timing adjusting device according to this example may inhibit a noise.

The description below explains the embodiments of the present disclosure based on the accompanying drawings. The same reference numerals may be used for the mutually corresponding elements in the embodiments to omit a duplicate description. A subsequent embodiment may describe only part of the configuration. In such a case, the other part of the configuration applies to the corresponding part of the configuration described in the preceding embodiment. Combinations of the configurations are not limited to those explicitly described in the embodiments. The configurations of the embodiments may be partially combined, even when not explicitly described, except an invalid combination.

First Embodiment

As illustrated in FIG. 1, a valve timing adjusting device 1 according to the first embodiment is provided for a transmission system that transmits crank torque to a camshaft 2 from a crankshaft (not shown) in an internal combustion engine of a vehicle. The camshaft 2 transmits the crank torque to open and close an intake valve (not shown) included in "valves" of the internal combustion engine. The device 1 adjusts the valve timing of the intake valve.

Basic Configuration

A basic configuration of the device 1 will be described below. The device 1 mainly includes an actuator 4, an energization control unit 7, and a phase adjustment unit 8.

The actuator 4 represents an electric motor such as a brushless motor and includes a housing body 5 and a control shaft 6. The housing body 5 is fastened to a fixed joint of the internal combustion engine and rotatably supports the control shaft 6. The energization control unit 7 mainly includes a driving driver and its control microcomputer and is placed outside and/or inside the housing body 5. The energization control unit 7 rotationally drives the control shaft 6 by controlling the energization to the electrically connected actuator 4.

Figure 2:
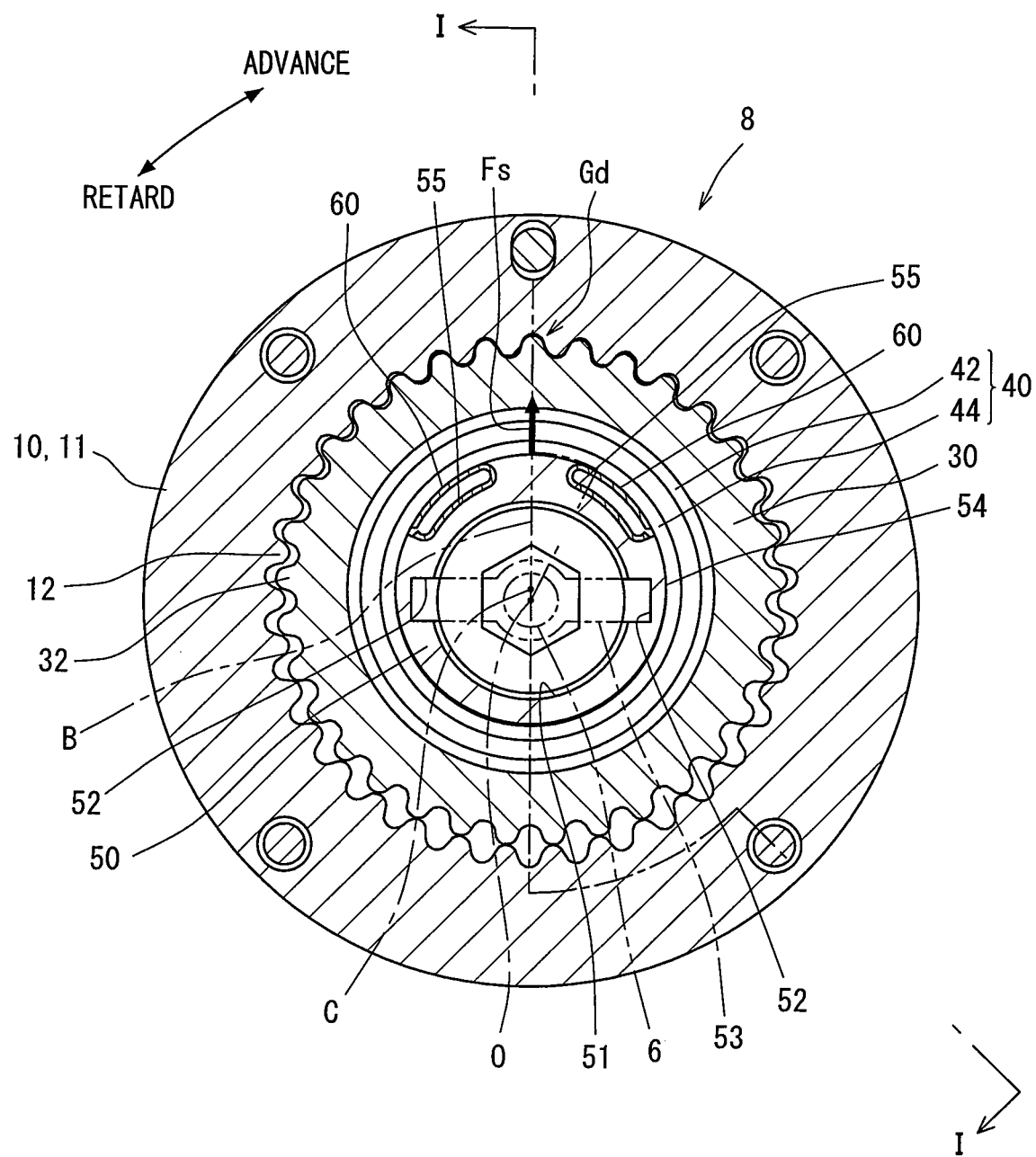
FIG. 2 is a cross sectional view taken along the line II-II of FIG. 1.
Figure 3:
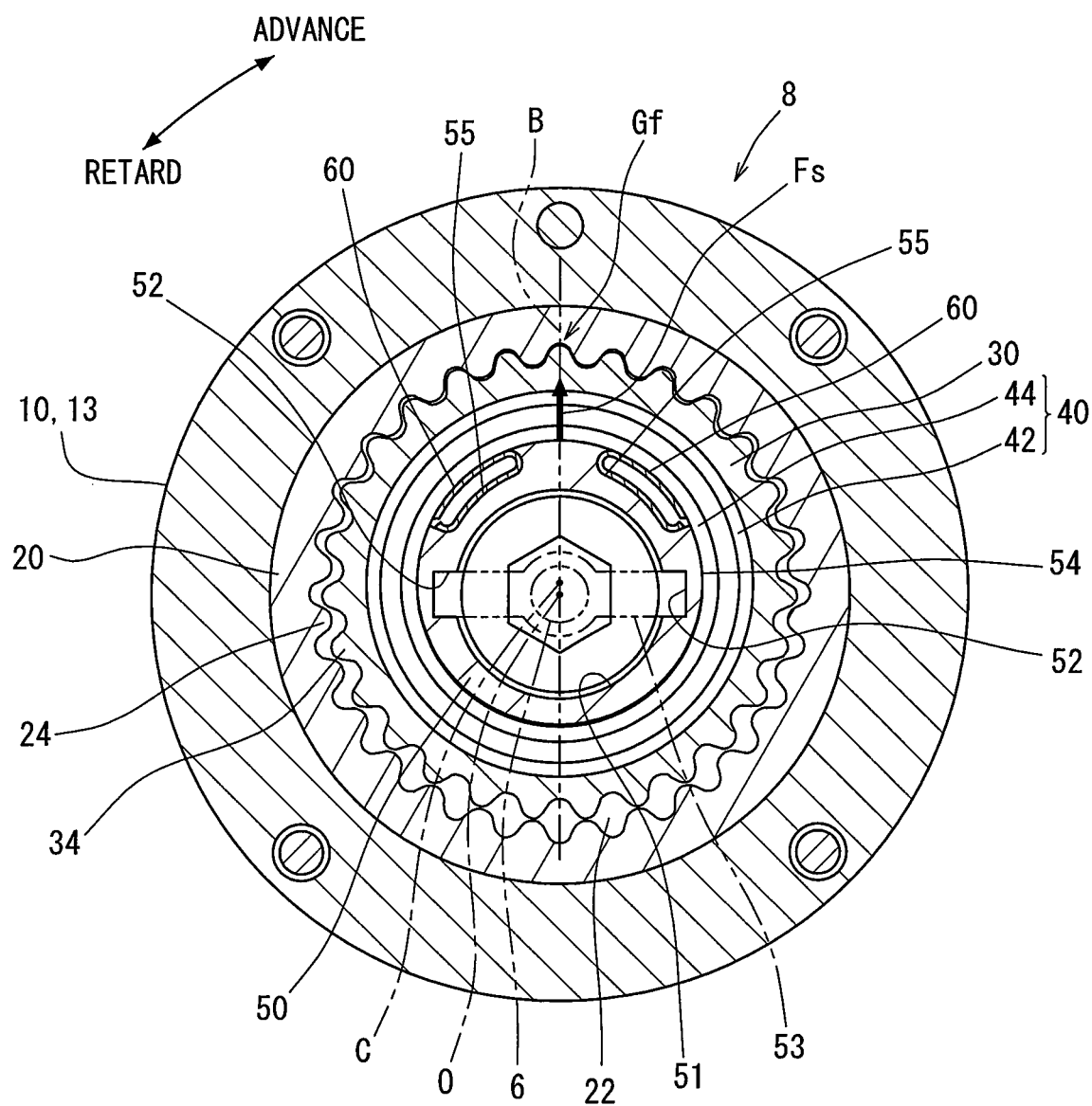
FIG. 3 is a cross sectional view taken along the line III-III of FIG. 1.

As illustrated in FIGS. 1 through 3, the phase adjustment unit 8 includes a driving rotor 10, a driven rotor 20, a planetary gear 30, a planetary bearing 40, a planetary carrier 50, and an elastic member 60.

The metal driving rotor 10 is formed to be hollow as a whole and internally accommodates the other components 20, 30, 40, 50, and 60 of the phase adjustment unit 8. The driving rotor 10 includes a sun gear member 11 shaped in an annular plate, a sprocket member 13 shaped in a bottomed cylinder, and a cover member 14 shaped in a stepped cylinder. The driving rotor 10 allows the sprocket member 13 and the cover member 14 to sandwich the sun gear member 11 and mutually fastens the members 11, 13, and 14.

As illustrated in FIGS. 1 and 2, the sun gear member 11 includes a driving internal gear portion 12 on a peripheral wall portion. The driving internal gear portion 12 includes an addendum circle inward in the radial direction of a root circle. As illustrated in FIG. 1, the sprocket member 13 has a plurality of sprocket teeth 19 on a peripheral wall portion. The sprocket teeth 19 protrude outward in the radial direction from locations at regular intervals in a circumferential direction. The sprocket member 13 interlocks with the crankshaft by installing a timing chain (not shown) on the sprocket teeth 19 and a plurality of sprocket teeth of the crankshaft. The crank torque output from the crankshaft is transmitted to the sprocket member 13 via the timing chain. As a result, the driving rotor 10 rotates in conjunction with the crankshaft in a specified direction (clockwise in FIGS. 2 and 3) around revolution centerline O.

As illustrated in FIGS. 1 and 3, a metal driven rotor 20 is shaped in a bottomed cylinder and is placed inward in the radial direction of the sprocket member 13. The driven rotor 20 is coaxially fitted in the sprocket member 13 and thereby radially supports the driving rotor 10 from inside in the radial direction. The driven rotor 20 is sandwiched between the sun gear member 11 and the sprocket member 13 in the axial direction. The driven rotor 20 forms a coupling portion 22 on a bottom wall portion. The coupling portion 22 is coaxially coupled with the camshaft 2. The driven rotor 20 is configured to rotate in conjunction with the camshaft 2 in the same direction (clockwise in FIG. 3) around revolution centerline O in common with the driving rotor 10 and is concurrently rotatable relative to the driving rotor 10.

The driven rotor 20 forms a driven internal gear portion 24 on a peripheral wall portion. The driven internal gear portion 24 includes an addendum circle inward in the radial direction of a root circle. The driven internal gear portion 24 is placed at a location where the driven internal gear portion 24 is displaced toward the camshaft 2 in the axial direction and does not overlap with the driving internal gear portion 12 in the radial direction. The inside diameter of the driven internal gear portion 24 is smaller than the inside diameter of the driving internal gear portion 12. The number of teeth of the driven internal gear portion 24 is smaller than the number of teeth of the driving internal gear portion 12.

As illustrated in FIGS. 1 through 3, the metal planetary gear 30 is shaped in a stepped cylinder and is placed to range from the inside of the driven internal gear portion 24 in the radial direction to the inside of the driving internal gear portion 12 in the radial direction. The planetary gear 30 is eccentric with respect to the rotors 10 and 20 in a specified radial direction (upward in FIGS. 2 and 3). Therefore, rotation centerline C of the planetary gear 30 is displaced in a specified radial direction with reference to revolution centerline O for the rotors 10 and 20.

The planetary gear 30 integrally forms external gear portions 32 and 34 on a peripheral wall portion. The external gear portions 32 and 34 each include an addendum circle outward in the radial direction of a root circle. As illustrated in FIGS. 1 and 2, the driving external gear portion 32 engages with the driving internal gear portion 12 at an eccentric side where the planetary gear 30 gets eccentric with respect to the rotors 10 and 20. Driving engagement part Gd denotes a part where the driving external gear portion 32 engages with the driving internal gear portion 12.

As illustrated in FIGS. 1 and 3, the driven external gear portion 34 is formed at a location where the driven external gear portion 34 is displaced toward the camshaft 2 in the axial direction and does not overlap with the driving external gear portion 32 in the radial direction. The outside diameter of the driven external gear portion 34 differs from that of the driving external gear portion 32 and is smaller than the outside diameter of the driving external gear portion 32. The number of teeth of the driven external gear portion 34 is smaller than the number of teeth of the driving external gear portion 32. The driven external gear portion 34 engages with the driven internal gear portion 24 at the eccentric side. Driven engagement part Gf denotes a part where the driven external gear portion 34 engages with the driven internal gear portion 24 at the eccentric side.

The metal planetary bearing 40 is placed to range from the inside of the driving external gear portion 32 in the radial direction to the inside of the driven external gear portion 34 in the radial direction. The planetary bearing 40 is eccentric in the same specific radial direction as the planetary gear 30 with respect to the rotors 10 and 20. The planetary bearing 40 is coaxially positioned to the planetary gear 30.

The planetary bearing 40 represents a single-row radial bearing including a single row of spherical rolling elements 46 interposed between an outer ring 42 and an inner ring 44. Particularly, according to the present embodiment, the planetary bearing 40 represents a single-row deep groove ball bearing. The outer ring 42 is coaxially press-fitted to the planetary gear 30 and thereby radially supports the planetary gear 30 from the inside in the radial direction.

The metal planetary carrier 50 is shaped in a partially eccentric cylinder and is placed to range from the inside of the inner ring 44 in the radial direction to the inside of the cover member 14 in the radial direction. The planetary carrier 50 forms a cylindrically planar input portion 51 on the peripheral wall portion. The input portion 51 is coaxially positioned to the rotors 10 and 20 and the control shaft 6. The input portion 51 includes a coupling groove 52 engaged with a joint 53. The control shaft 6 is coaxially coupled with the planetary carrier 50 via the joint 53. The planetary carrier 50 is configured to rotate in conjunction with the control shaft 6 around revolution centerline O and is concurrently rotatable relative to the rotors 10 and 20.

The planetary carrier 50 forms a cylindrically planar eccentricity portion 54 on the peripheral wall portion. The eccentricity portion 54 is eccentric in the same specified direction as the planetary gear 30 with respect to the rotors 10 and 20. The eccentricity portion 54 is coaxially fitted in the inner ring 44 and thereby radially supports the inner ring 44 from the inside in the radial direction. The planetary carrier 50 supports the planetary gear 30 via the planetary bearing 40. The external gear portions 32 and 34 of the planetary gear 30 vary engagement parts Gd and Gf in response to the relative rotation of the planetary carrier 50 with respect to the driving rotor 10 and concurrently performs a planetary motion in conjunction with each other. In a state of gearing with the rotors 10 and 20 at the eccentric side, the planetary gear 30 rotates in its circumferential direction around rotation centerline C and concurrently revolves in a rotational direction of the planetary carrier 50 around revolution centerline O, namely, in the circumferential direction of the input portion 51.

The metal elastic member 60 is accommodated in each of accommodating recessed portions 55 opened at two locations in the circumferential direction of the eccentricity portion 54. Each elastic member 60 represents a leaf spring whose sectional view is approximately U-shaped. Each elastic member 60 is interposed between the accommodating recessed portion 55 and the inner ring 44 outside in the radial direction. Each elastic member 60 elastically deforms by being pressed in the radial direction of the planetary gear 30 and the planetary bearing 40. As illustrated in FIGS. 2 and 3, it is premised that reference plane B extends over the eccentric side and the opposite side along the specified radial direction causing the planetary gear 30 and the planetary bearing 40 to be eccentric from the rotors 10 and 20 and includes revolution centerline O and rotation centerline C. Based on this premise, each elastic member 60 is placed at a position to be line-symmetric with reference plane B. The elastic members 60 elastically deform to generate a restoring force. Resultant force Fs of the restoring forces acts on the inner ring 44 in the specified radial direction along reference plane B at the eccentric side. The planetary gear 30 is subject to resultant force Fs of the restoring forces from the elastic members 60 via the planetary bearing 40 and is pressed to the eccentric side to maintain the state of gearing with the rotors 10 and 20.

The phase adjustment unit 8 configured as above adjusts rotational phases between the rotors 10 and 20 to a specified phase adjustment range based on rotation states of the control shaft 6. The result provides a valve timing adjustment appropriate to operation situations of the internal combustion engine.

Specifically, the control shaft 6 rotates at the same speed as the driving rotor 10 and the planetary carrier 50 does not rotate relative to the driving rotor 10. In this case, the planetary gear 30 does not make a planetary motion while the external gear portions 32 and 34 remain engaged with the internal gear portions 12 and 24, respectively. The rotors 10 and 20 thereby rotate in conjunction with the planetary gear 30. The rotational phase of the driven rotor 20 remains substantially unchanged concerning the driving rotor 10. Consequently, the valve timing is adjusted and maintained.

Meanwhile, the control shaft 6 rotates at a low speed or in the direction opposite to the driving rotor 10 and the planetary carrier 50 rotates toward a retard angle relative to the driving rotor 10. In this case, the planetary gear 30 makes a planetary motion while the external gear portions 32 and 34 remain engaged with the internal gear portions 12 and 24, respectively. The driven rotor 20 rotates toward the retard angle relative to the driving rotor 10 and changes the rotational phase of the driven rotor 20 concerning the driving rotor 10 based on the retard angle. Consequently, the valve timing is adjusted to the retard angle.

The control shaft 6 rotates faster than the driving rotor 10 and the planetary carrier 50 rotates toward an advance angle relative to the driving rotor 10. In this case, the planetary gear 30 makes a planetary motion while the external gear portions 32 and 34 remain engaged with the internal gear portions 12 and 24, respectively. The driven rotor 20 rotates toward the advance angle relative to the driving rotor 10 and changes the rotational phase of the driven rotor 20 concerning the driving rotor 10 based on the advance angle. Consequently, the valve timing is adjusted to the advance angle.

The phase adjustment range allows a rotational phase of the driven rotor 20 to be adjusted concerning the driving rotor 10. The driving rotor 10 locks a stopper 28 (see FIG. 1) of the driven rotor 20 at both sides of the rotational direction to regulate the phase adjustment range.

Detailed Configuration of the Phase Adjustment Unit

The description below explains the detailed configuration of the phase adjustment unit 8.

Figure 4:
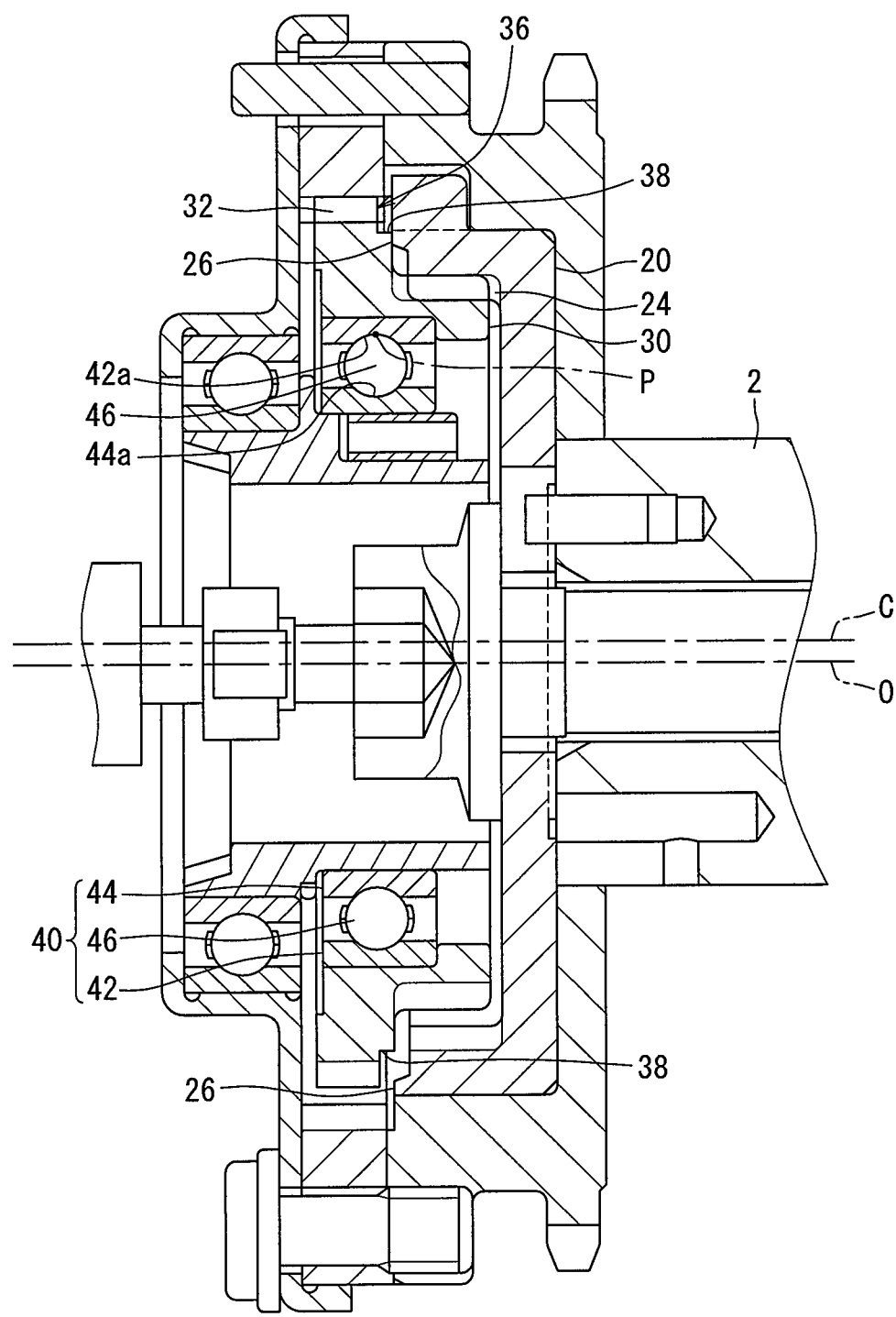
FIG. 4 is an expanded sectional view showing a phase adjustment unit according to the first embodiment and corresponds to FIG. 1.
Figure 5:
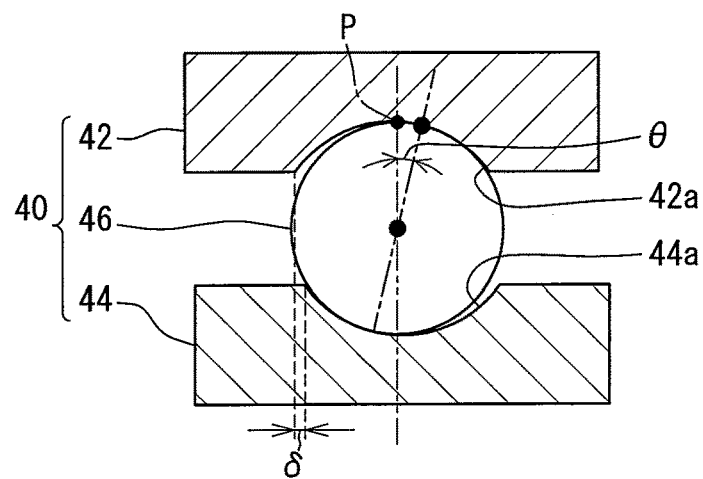
FIG. 5 is a schematic diagram showing features of a planetary bearing according to the first embodiment.
Figure 6:
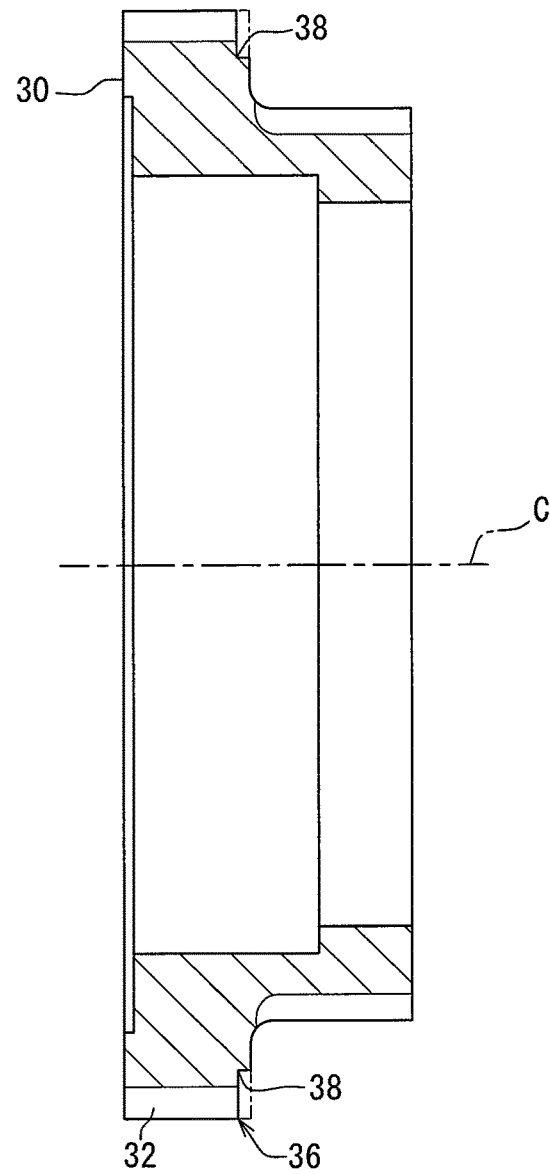
FIG. 6 is an expanded sectional view taken along the line VI-VI of FIG. 7 and showing a planetary gear according to the first embodiment.

In the planetary bearing 40 as illustrated in FIGS. 4 and 5, the outer ring 42 forms an outer ring orbit plane 42a in the shape of an annular groove that is concaved outward in the radial direction to form an arcing sectional view and continues in the entirety of an area in the circumferential direction. In the planetary bearing 40, the inner ring 44 forms an inner ring orbit plane 44a in the shape of an annular groove that is concaved inward in the radial direction to form an arcing sectional view and continues in the entirety of an area in the circumferential direction. The outer ring orbit plane 42a and the inner ring orbit plane 44a make rolling contact with outer peripheral surfaces of the spherical rolling elements 46 placed between the outer ring orbit plane 42a and the inner ring orbit plane 44a.

As illustrated in FIG. 5, the outer ring orbit plane 42a and the inner ring orbit plane 44a are formed at the center in the axial direction respectively for the outer ring 42 and the inner ring 44 that are mutually displaced in the axial direction and have the same length. The outer ring orbit plane 42a is displaced from the inner ring orbit plane 44a as much as set amount 6 toward the side opposite to the camshaft 2. The spherical rolling elements 46 make rolling contact with the outer ring orbit plane 42a by forming contact angle δ on the camshaft 2.

As illustrated in FIGS. 4 and 8, the driven rotor 20 shaped in a bottomed cylinder allows the peripheral wall portion to coaxially form a thrust bearing portion 26 at the end in the axial direction opposite to the camshaft 2. The thrust bearing portion 26 has an annularly planar end face. In the driven rotor 20, the thrust bearing portion 26 protrudes from the driven internal gear portion 24 toward the side opposite to the camshaft 2 in the axial direction. In the driven rotor 20, the thrust bearing portion 26 continuously extends in the entirety of an area in the rotational direction (namely, the circumferential direction) around revolution centerline O. The thrust bearing portion 26 is slidably placed against the axial-direction end face toward the camshaft 2 of the driving external gear portion 32 in the planetary gear 30. Therefore, the thrust bearing portion 26 is configured to support the planetary gear 30 from the side toward the camshaft 2, namely, one of the sides in the axial direction.

As illustrated in FIGS. 4 and 6 through 8, an outer peripheral portion 36 of the planetary gear 30 includes a recessed portion 38 dented toward the side opposite to the camshaft 2 in the axial direction. The recessed portion 38 is provided at the end of the driving external portion 32 toward the camshaft 2 in the axial direction. The driving external portion 32 forms the outer peripheral portion 36 of the planetary gear 30. The recessed portion 38 is opened toward the thrust bearing portion 26 positioned at the camshaft 2 in the axial direction and outward in the radial direction.

Figure 8B:
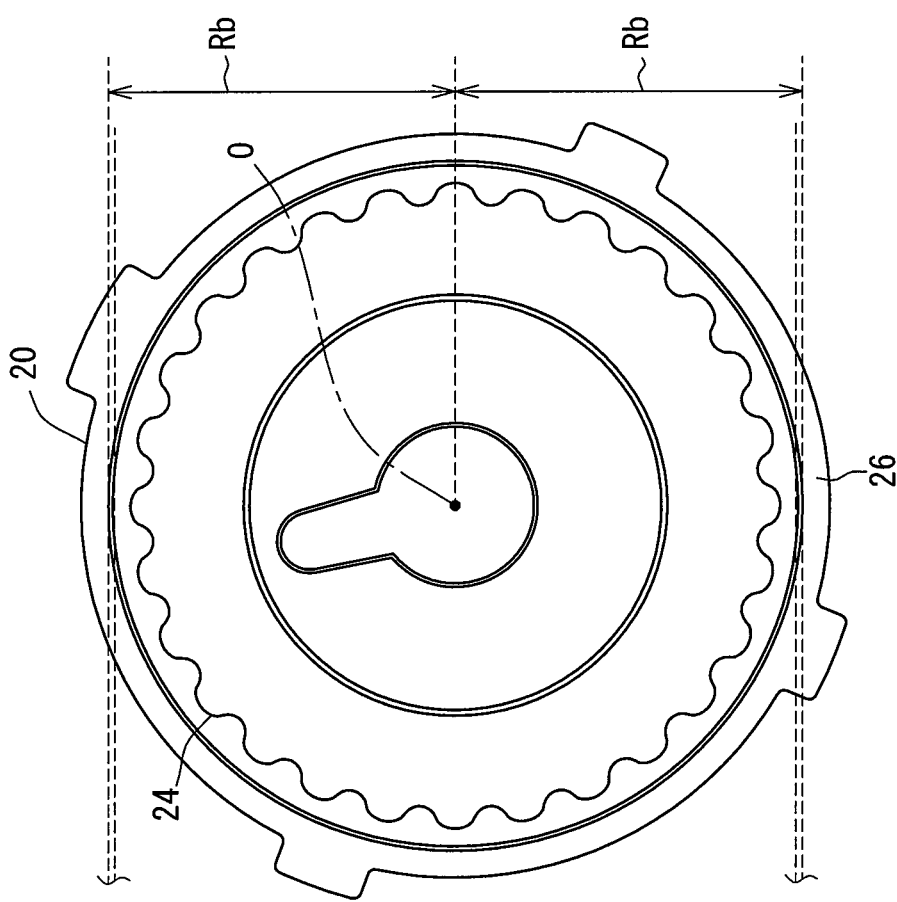
FIG. 8B is a schematic diagram showing a driven rotor according to the first embodiment.
Figure 8A:
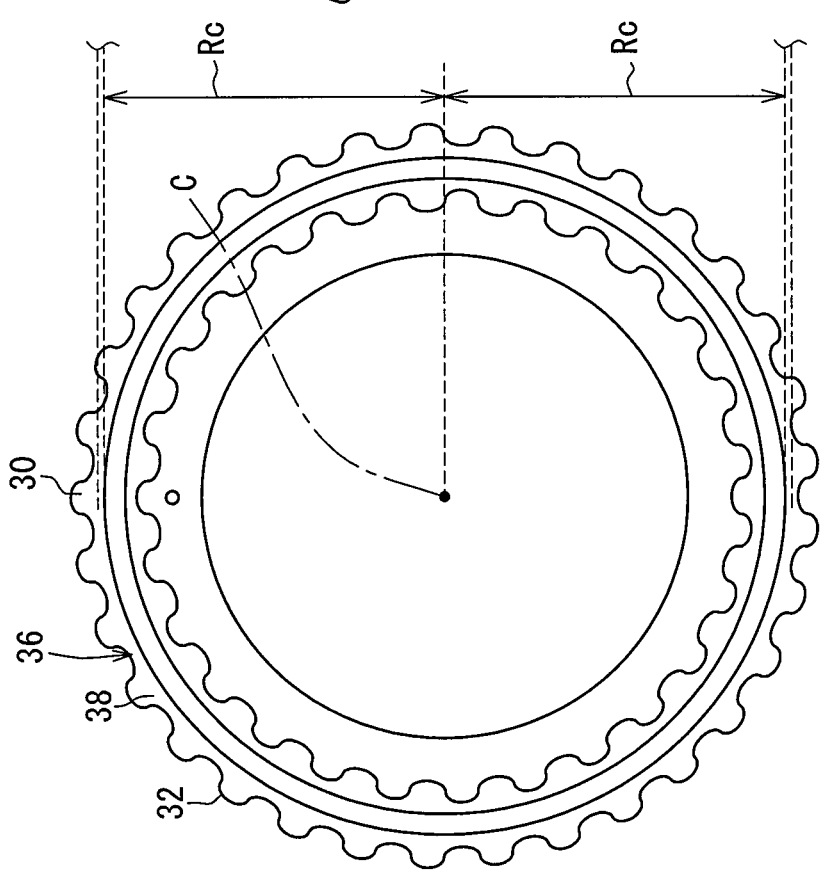
FIG. 8A is a schematic diagram showing a planetary gear.

The recessed portion 38 continuously extends in the entirety of an area in a rotational direction of the planetary gear 30, namely, in the circumferential direction. The recessed portion 38 is formed coaxially with the planetary gear 30 and is shaped in an annular square groove having an L-shaped cross-section inside. According to the first embodiment, the recessed portion 38 is positioned on reference plane B at an anti-eccentric side opposite to the eccentric side with respect to rotation centerline C of the planetary gear 30 in the entirety of the phase adjustment range predetermined as a "specific phase." As illustrated in FIGS. 8A and 8B, innermost circumference radius Rc denotes an inner diameter of the annular recessed portion 38. Innermost circumference radius Rb denotes an inner diameter of the annular thrust bearing portion 26. Innermost circumference radius Rc is smaller than innermost circumference radius Rb.

Figure 7:
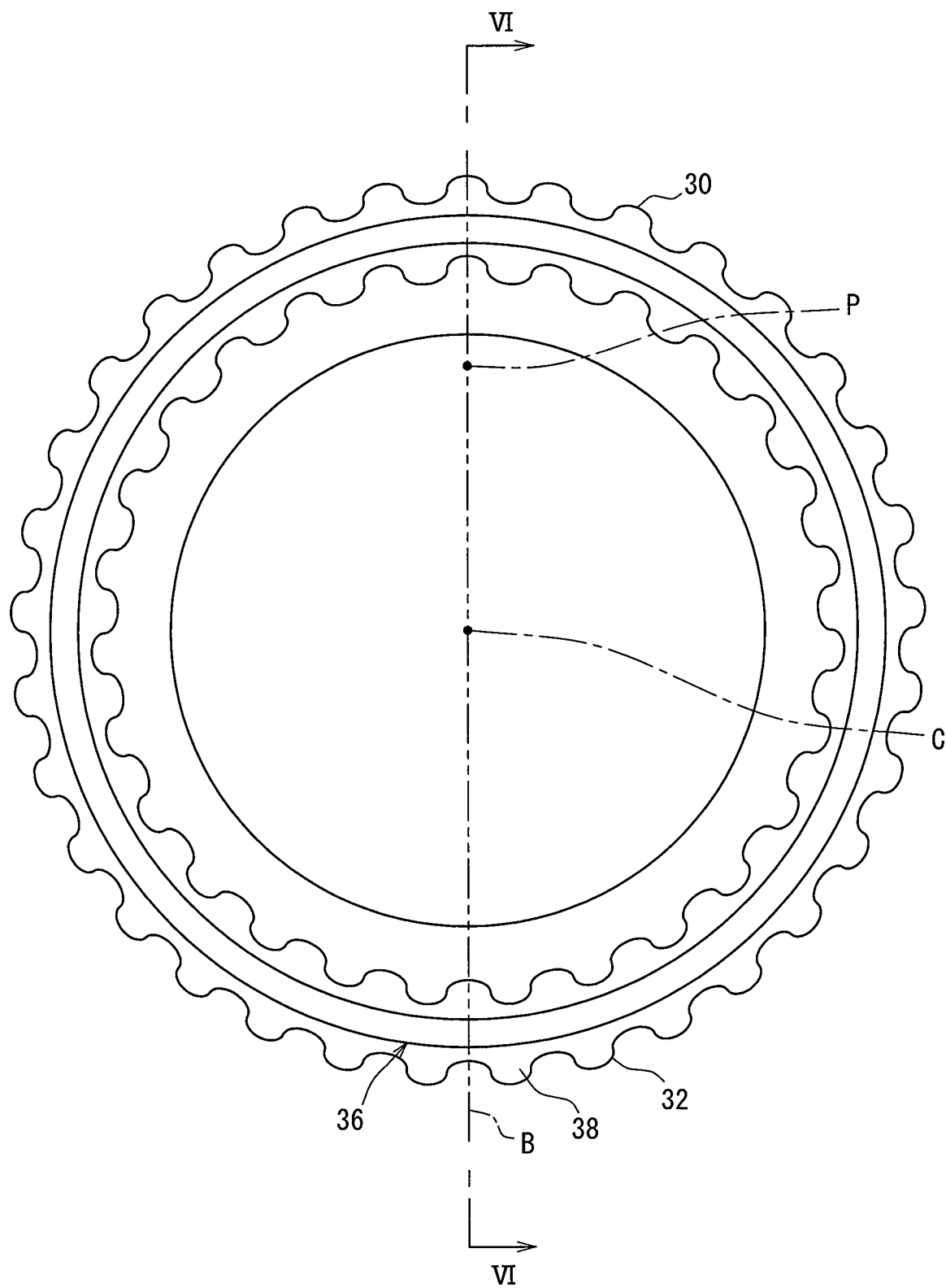
FIG. 7 is an enlarged front view showing the planetary gear according to the first embodiment.

Based on the above-described configuration, FIGS. 9A and 9B and FIGS. 10A and 10B schematically illustrate the thrust bearing portion 26 of the driven rotor 20. A clearance 70 due to the manufacturing tolerance is inevitably formed between the thrust bearing portion 26 and the driving external gear portion 32 including the recessed portion 38 in the planetary gear 30. Due to the clearance 70, rotation centerline C of the planetary gear 30 may tilt with respect to revolution centerline O for the rotors 10 and 20. The planetary gear 30 allows the spherical rolling elements 46 to make rolling contact with the outer ring orbit plane 42a of the outer ring 42 of the planetary bearing 40. As illustrated in FIGS. 4, 5, and 7, the outer ring orbit plane 42a includes point P on reference plane B at the eccentric side with respect to rotation centerline C before tilting. Point P is denoted as tilt center point P as illustrated in FIGS. 9A and 9B and FIGS. 10A and 10B.

Figure 9A:
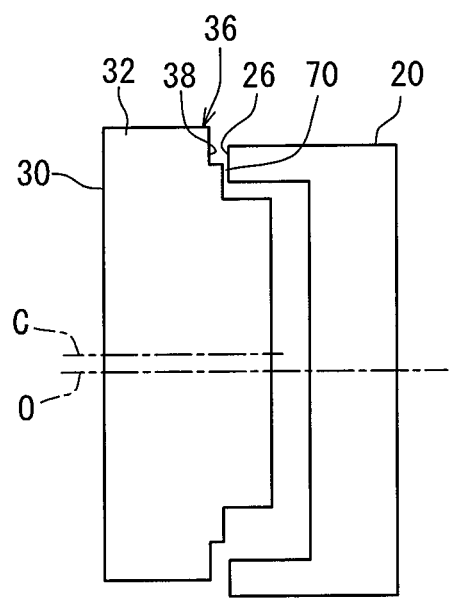
FIGS. 9A and 9B are schematic diagrams each showing an operation state according to the first embodiment.
Figure 9B:
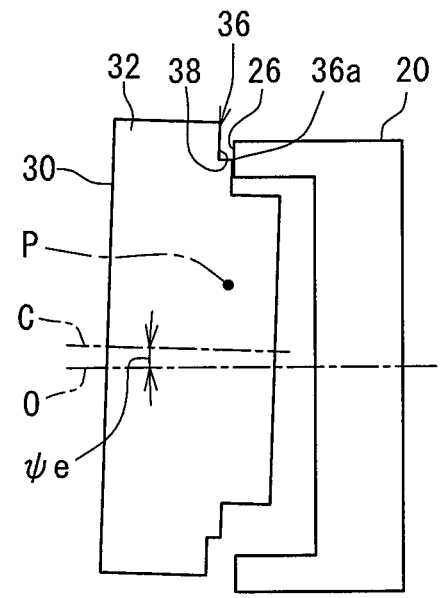
Figure 11:
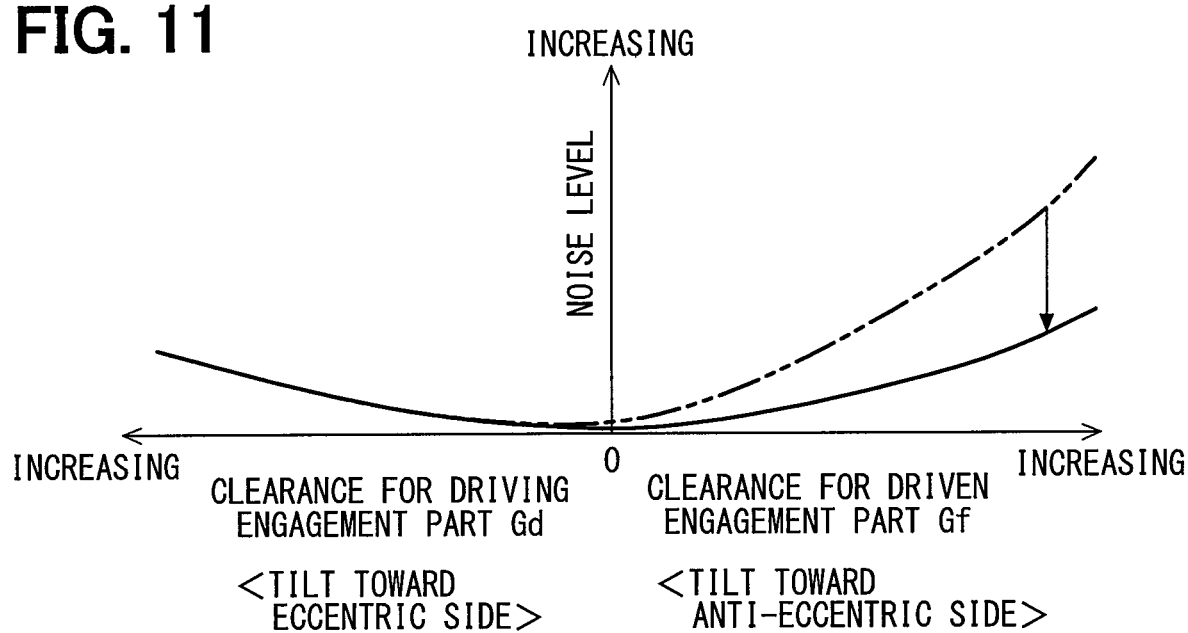
FIG. 11 is a graph showing an effect of the first embodiment.

Specifically, when driving engagement part Gd causes a larger clearance than driven engagement part Gf as illustrated in FIG. 11, as illustrated in FIGS. 9A AND 9B, the planetary gear 30 tilts to approach the thrust bearing portion 26 at the eccentric side. The tilt toward the eccentric side causes a tilt angle that allows the outer peripheral portion 36 as the pertinent proximate location to make contact with the thrust bearing portion 26. The thrust bearing portion 26 thereby supports the outer peripheral portion 36. The tilt angle in this thrust bearing state (or contact state) is denoted as necessary tilt angle ψe that reduces the clearances for engagement parts Gd and Gf, particularly the clearance for driving engagement part Gd and is capable of inhibiting a noise. The tilt toward the eccentric side according to the first embodiment allows the outer peripheral portion 36 to make contact with the thrust bearing portion 26 at a specific location. Specifically, this location corresponds to an edge portion 36a formed by an innermost circumference of the recessed portion 38 and the end face of the driving external gear portion 32 in the axial direction toward the camshaft 2.

Figure 10A:
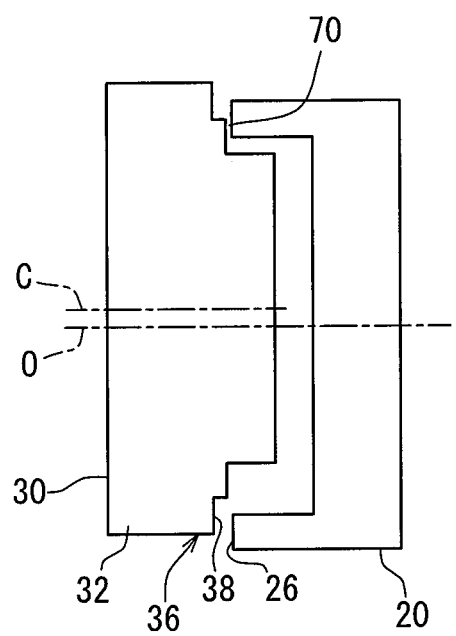
FIGS. 10A and 10B are schematic diagrams each showing an operation state different from those of FIGS. 9A and 9B.
Figure 10B:
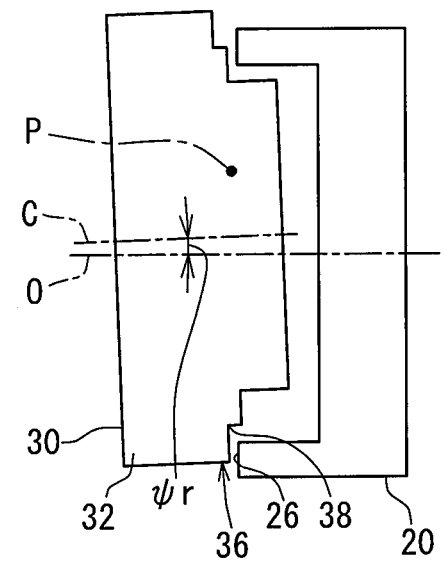

When driven engagement part Gf causes a larger clearance than driving engagement part Gd as illustrated in FIG. 11, as illustrated in FIGS. 10A and 10B, the planetary gear 30 tilts to approach the thrust bearing portion 26 at the anti-eccentric side. The tilt toward the anti-eccentric side allows the distance between the outer peripheral portion 36 as the pertinent proximate location and tilt center point P to be longer than the above-described tilt toward the eccentric side. According to the first embodiment, the planetary gear 30 tilts until the thrust bearing portion 26 enters the recessed portion 38 in the "specific phase" applicable to the entire phase adjustment range. The result is to ensure necessary tilt angle ψr similar to the above-described tilt toward the eccentric side even in the state where an inner face of the recessed portion 38 is separated from the thrust bearing portion 26. According to this tilt toward the anti-eccentric side, necessary tilt angle ψr reduces the clearances for engagement parts Gd and Gf, particularly the clearance for driven engagement part Gf and is capable of inhibiting a noise.

Operation and Effect

The description below explains the operation and effect of the above-described first embodiment.

According to the first embodiment, the planetary gear 30 allows the spherical rolling elements to make rolling contact with the outer ring orbit plane 42a of the outer ring 42 of the planetary bearing 40. The planetary gear 30 tends to tilt at tilt center point P, namely, the point on the outer ring orbit plane 42a toward the eccentric side with respect to rotation centerline C. As a result, the planetary gear 30 tilts with respect to revolution centerline O common to the rotors 10 and 20 that include engagement parts Gd and Gf at the eccentric side. The planetary gear 30 is supported by the thrust bearing portion 26 of the driven rotor 20 around revolution centerline O.

When the planetary gear 30 tilts to approach the thrust bearing portion 26 at the eccentric side, the distance between the proximate location and tilt center point P shortens. It is possible to reduce the clearances for engagement parts Gd and Gf and inhibit a noise even when the tilt angle causes the planetary gear 30 to make contact with the thrust bearing portion 26 at the eccentric side. Namely, it is possible to ensure necessary tilt angle ψe needed to reduce the clearances for engagement parts Gd and Gf and inhibit a noise.

When the planetary gear 30 tilts to approach the thrust bearing portion 26 at the anti-eccentric side, the distance between the proximate location and tilt center point P elongates. In the "specific phase" according to the first embodiment, the recessed portion 38 is positioned at the anti-eccentric side with respect to rotation centerline C of the planetary gear 30. The recessed portion 38 is opened toward the thrust bearing portion 26. Therefore, the tilted planetary gear 30 hardly makes contact with the thrust bearing portion 26 at the anti-eccentric side. In this case, the planetary gear maximally tilts to be able to ensure necessary tilt angle ψr.

As above, the first embodiment can ensure necessary tilt angles ψe and ψr and inhibit a noise even when the planetary gear 30 tilts at any side as illustrated in FIG. 11.

According to the first embodiment, when the planetary gear 30 tilts to approach the thrust bearing portion 26 at the anti-eccentric side, the outer peripheral portion 36 of the planetary gear 30 is closest to the thrust bearing portion 26. The recessed portion 38 provided in the outer peripheral portion 36 of the planetary gear 30 is opened toward the closest thrust bearing portion 26 in the entirety of the phase adjustment range as the "specific phase" of the first embodiment. It is possible to fully regulate the contact between the planetary gear 30 and the thrust bearing portion 26 at the anti-eccentric side. Therefore, it is possible to enhance the reliability of the effect of ensuring necessary tilt angles ψe and ψr and inhibiting a noise.

The first embodiment applies the "specific phase" to the entirety of the phase adjustment range where rotational phases are adjusted. The recessed portion 38 causes the planetary gear 30 to hardly make contact with the thrust bearing portion 26 at the anti-eccentric side in any rotational phase within the phase adjustment range. It is possible to ensure necessary tilt angles ψe and ψr and inhibit a noise regardless of rotational phases.

According to the first embodiment, the recessed portion 38 is continuously defined in the planetary gear 30 over the entire region in the rotational direction. The planetary gear 30 hardly makes contact with the thrust bearing portion 26 at the anti-eccentric side in the entirety of the phase adjustment range. Therefore, it is possible to enhance the reliability of the effect of ensuring necessary tilt angles ψe and ψr and inhibiting a noise regardless of rotational phases.

Figure 12:
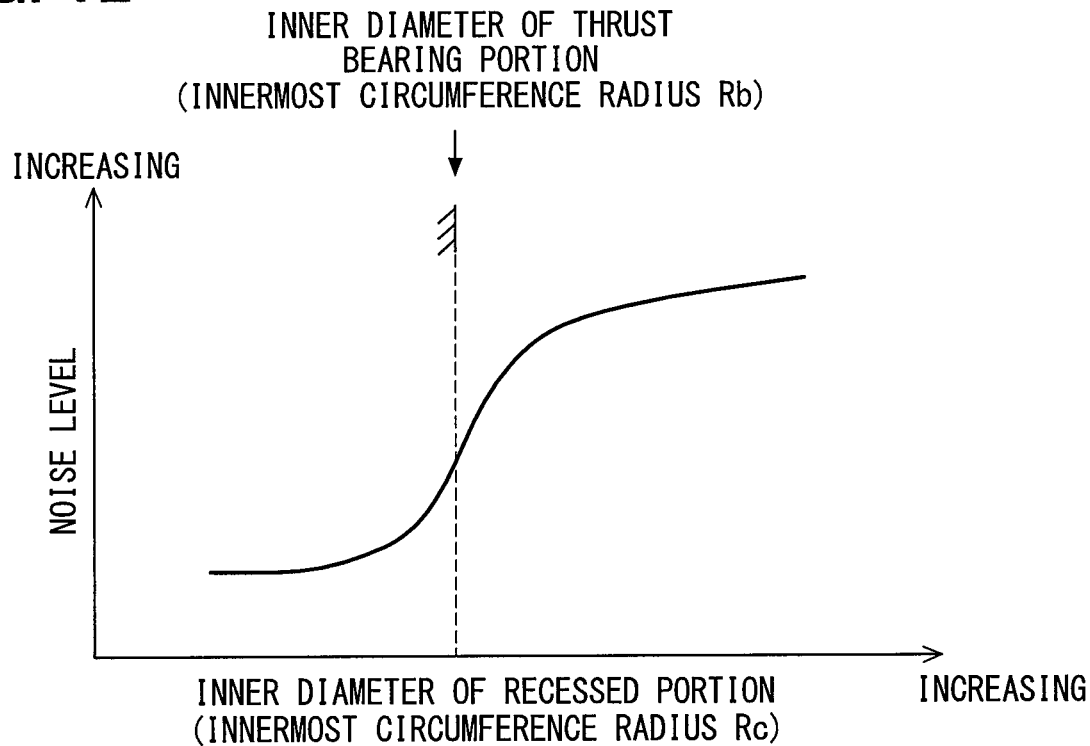
FIG. 12 is a graph showing an effect of the first embodiment.

According to the first embodiment, the annular recessed portion 38 continues in the entirety of the outer peripheral portion 36 of the planetary gear 30 in the rotational direction. Innermost circumference radius Rc of the annular recessed portion 38 is smaller than innermost circumference radius Rb of the annular thrust bearing portion 26 that continues in the entirety of the driven rotor 20 in the rotational direction. When the planetary gear 30 tilts to approach the thrust bearing portion 26 at the eccentric side, the planetary gear 30 may be regulated from making contact with the thrust bearing portion 26 at the anti-eccentric side. As illustrated in FIG. 12, it is possible to enhance the effect of inhibiting a noise due to the contact between the planetary gear 30 and the thrust bearing portion 26 at the anti-eccentric side.

Second Embodiment

The second embodiment of the present disclosure is a modification of the first embodiment.

As illustrated in FIGS. 13 through 16, a planetary gear 2030 according to the second embodiment includes an outer peripheral portion 2036. A recessed portion 2038 of the outer peripheral portion 2036 is formed on part of the entire region of the gear 2030 in the rotational direction and extends in the shape of a partial annular groove (arced groove) having an L-shaped cross-section inside.

Figure 13:
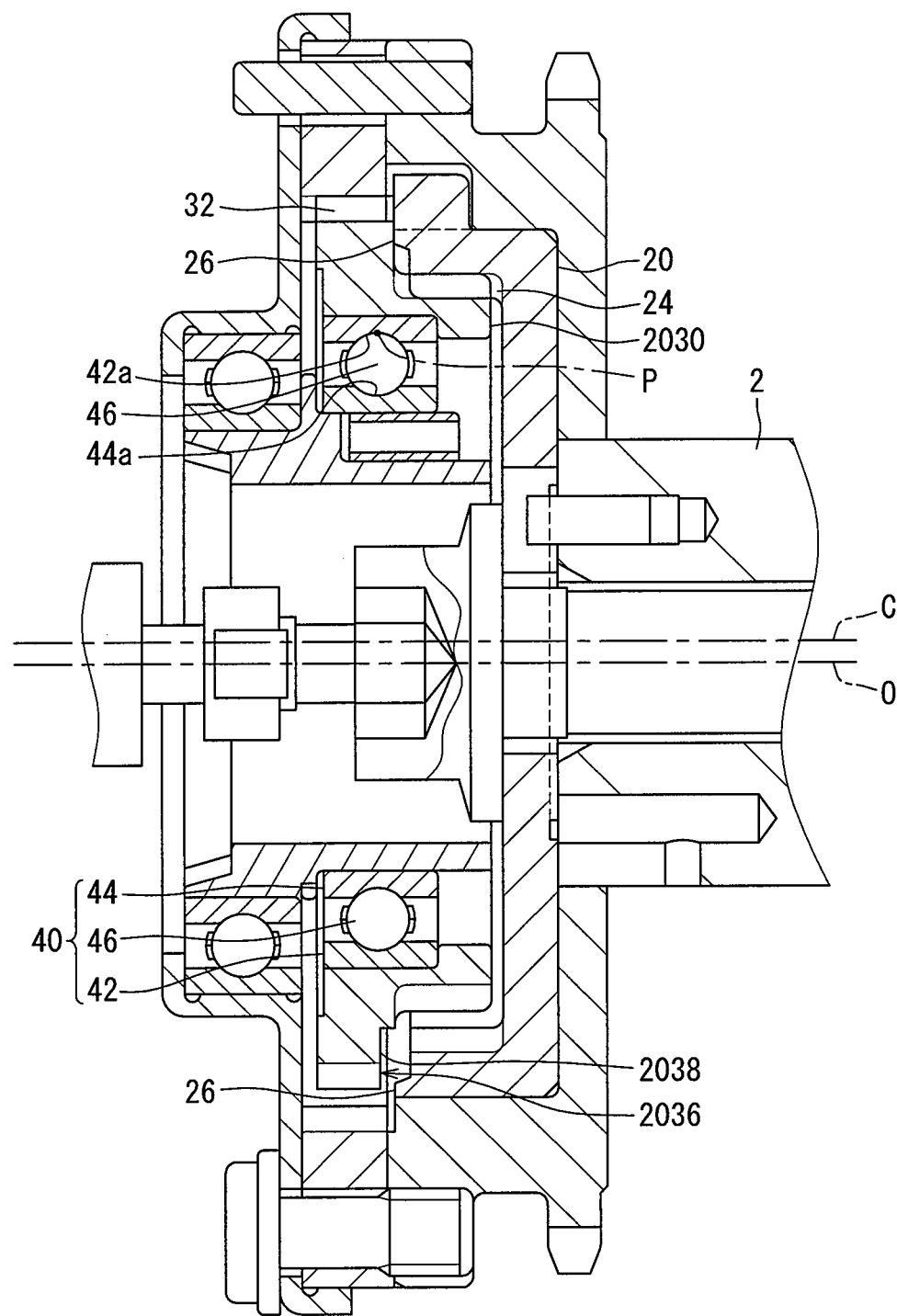
FIG. 13 is an expanded sectional view showing a phase adjustment unit according to a second embodiment and corresponds to FIG. 1.
Figure 17:
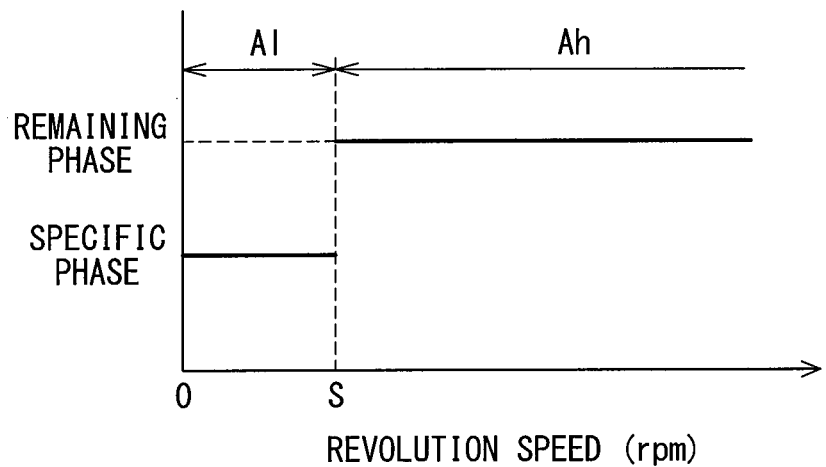
FIG. 17 is a graph showing an operation according to the second embodiment.

According to the second embodiment, as illustrated in FIG. 17, the revolution speed of the internal combustion engine may remain in low-speed range Al. Namely, the revolution speed may range from zero (0 rpm) to predetermined speed S (such as 1500 rpm as a maximum idle speed in general). While this state takes effect, the energization control unit 7 controls energization on the actuator 4 and adjusts the rotational phase to the "specific phase." The "specific phase" according to the second embodiment is predetermined to some rotational phases (such as the most retarded angle phase or an approximate rotational phase) corresponding to an extended length of the recessed portion 2038 within the phase adjustment range. According to the second embodiment, the energization control unit 7 controls the energization so that the recessed portion 2038 is positioned on reference plane B (see FIG. 16) at the anti-eccentric side with respect to rotation centerline C of the planetary gear 2030 in some rotational phases as the "specific phase" within the phase adjustment range as illustrated in FIG. 13.

Figure 18A:
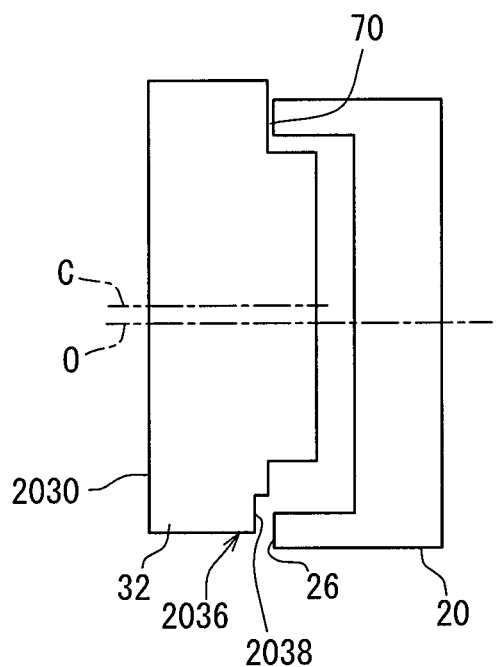
FIGS. 18A and 18B are schematic diagrams each showing an operation state according to the second embodiment.
Figure 18B:
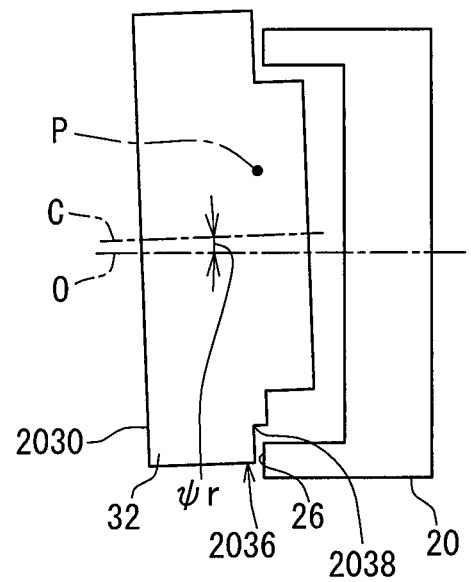
Figure 19A:
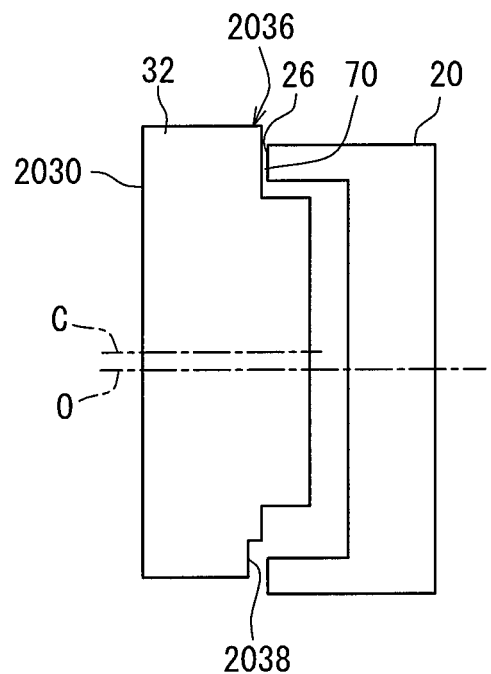
FIGS. 19A and 19B are schematic diagrams each showing an operation state different from FIGS. 18A and 18B.
Figure 19B:
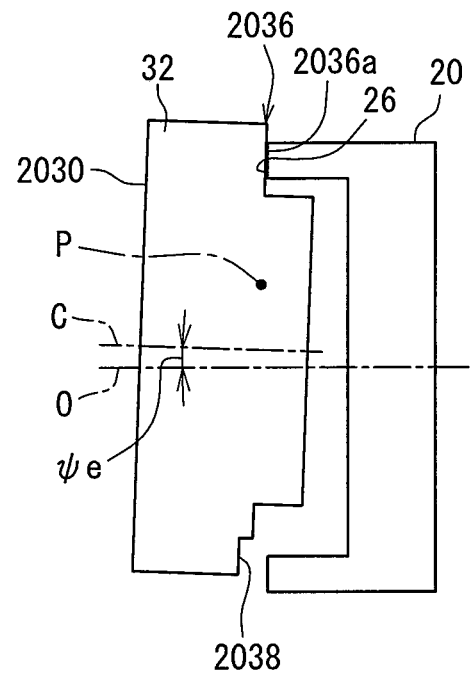

In the case of the tilt toward the anti-eccentric side in the "specific phase" schematically illustrated in FIGS. 18A and 18B, a principle comparable to the first embodiment ensures necessary tilt angle $\psi r$. In the case of the tilt toward the eccentric side in the "specific phase" schematically illustrated in FIGS. 19A and 19B, the principle comparable to the first embodiment ensures necessary tilt angle $\psi e$. In this case, the outer peripheral portion 2036 of the planetary gear 2030 includes an unrecessed portion 2036a corresponding to the recessed portion 2038. The unrecessed portion 2036a approaches and makes contact with the thrust bearing portion 26.

Figure 14:
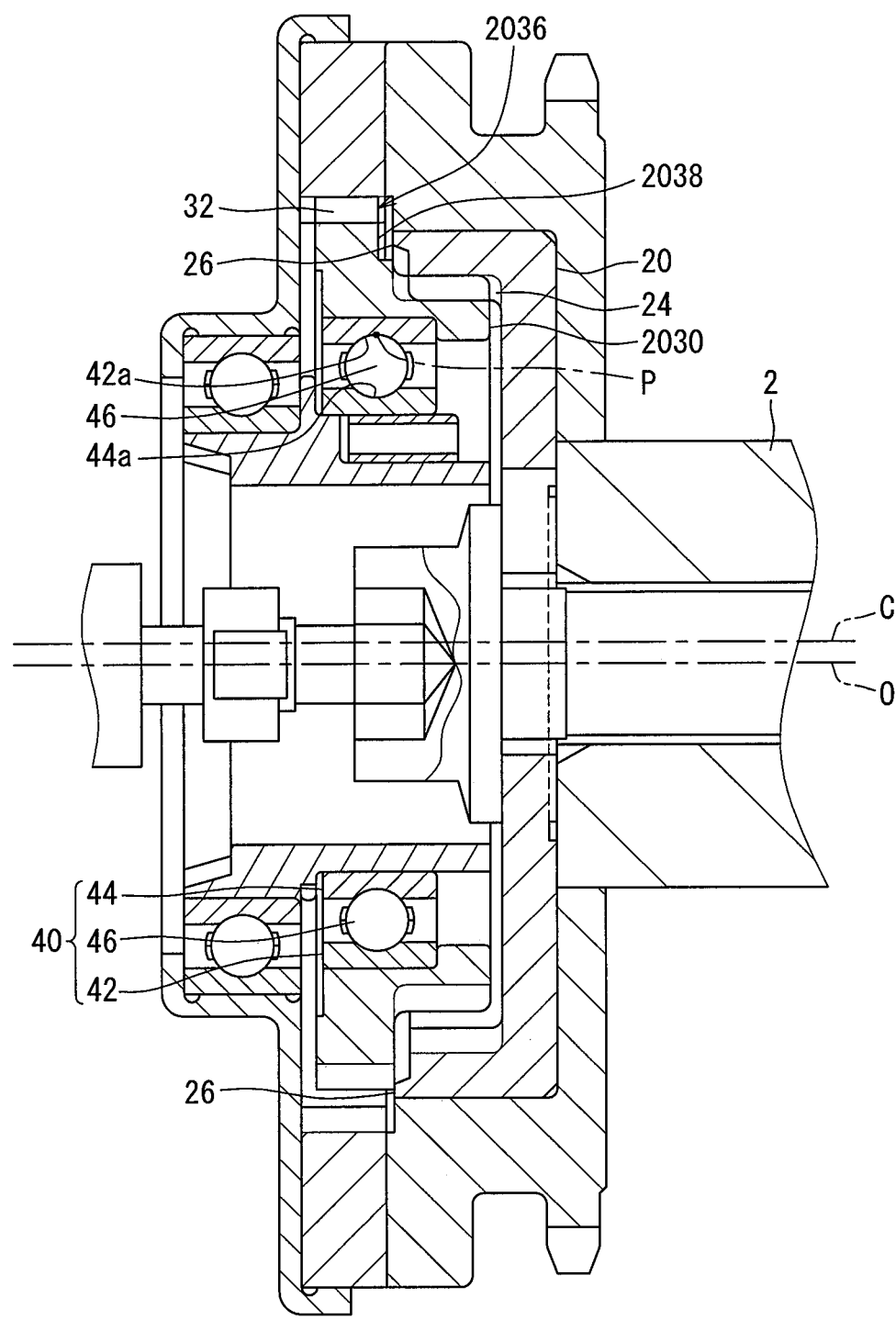
FIG. 14 is a sectional view showing an operation state different from FIG. 13.
Figure 15:
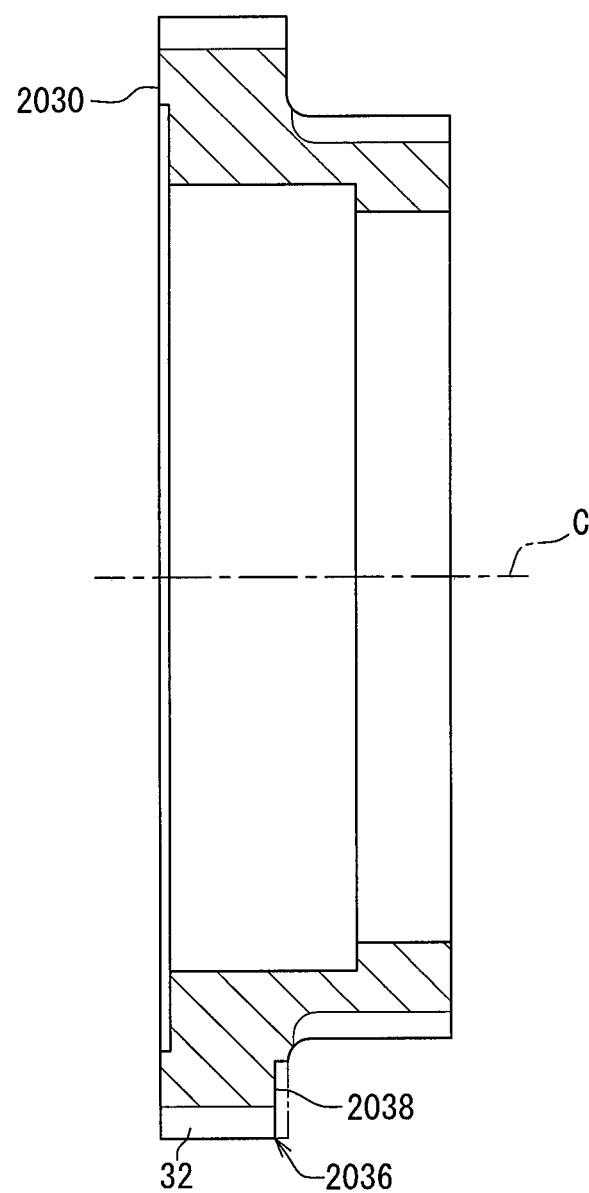
FIG. 15 is an expanded sectional view showing a planetary gear according to the second embodiment taken along the line XV-XV of FIG. 16.
Figure 16:
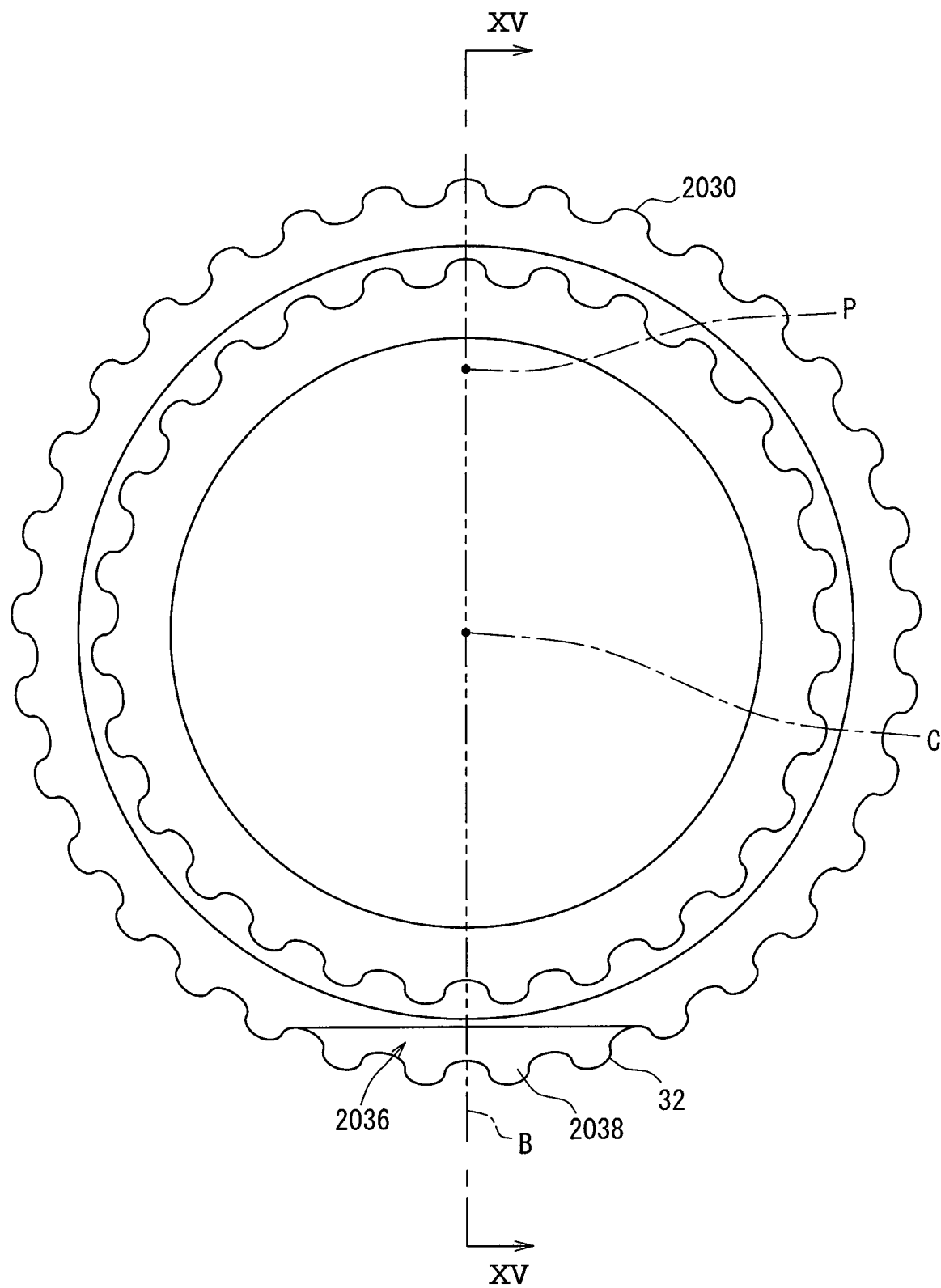
FIG. 16 is an enlarged front view of the planetary gear according to the second embodiment.
Figure 20A:
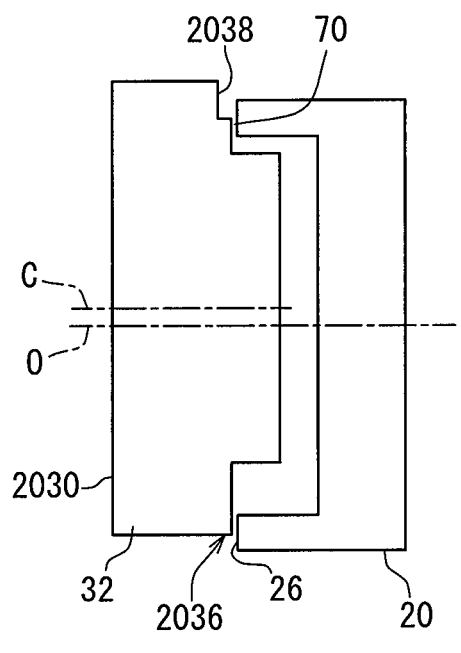
FIGS. 20A and 20B are schematic diagrams each showing an operation state different from FIGS. 18A to 19B.
Figure 20B:
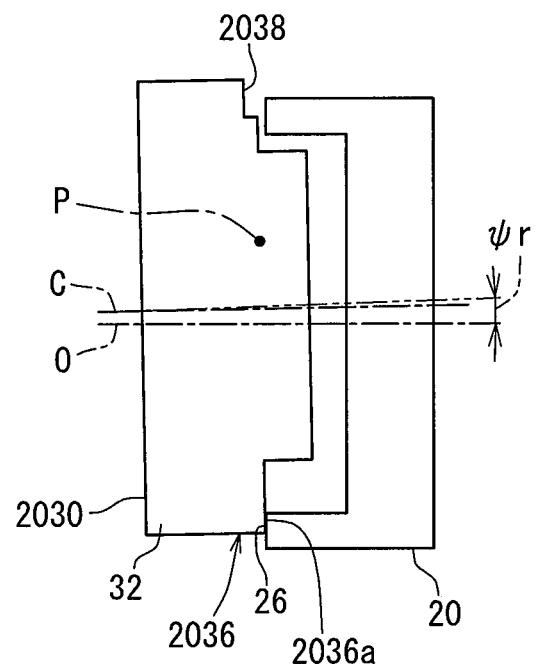
Figure 21A:
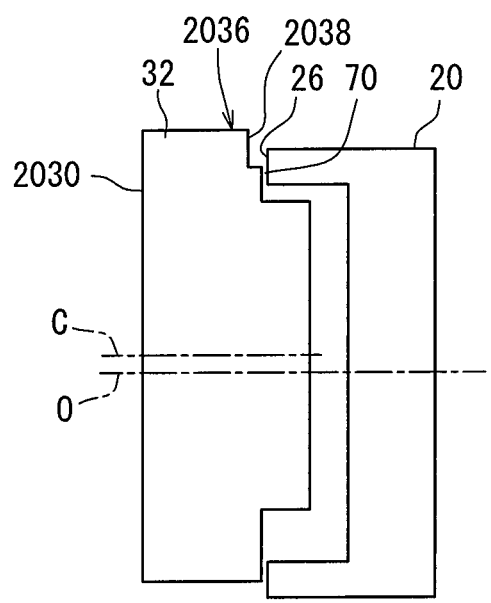
FIGS. 21A and 21B are schematic diagrams each showing an operation state different from FIGS. 18A to 20B.
Figure 21B:
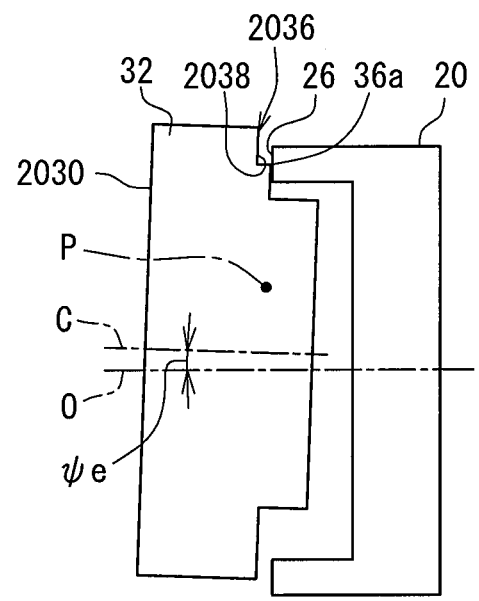

According to the second embodiment, as illustrated in FIG. 17, when the revolution speed of the internal combustion engine changes from low-speed range Al to high-speed range Ah, namely, the revolution speed exceeds predetermined speed S, the energization control unit 7 controls energization on the actuator 4 and adjusts the rotational phase to a remaining phase outside the "specific phase." According to the second embodiment, the energization control unit 7 controls the energization so that the recessed portion 2038 is positioned on reference plane B outside the anti-eccentric side with respect to rotation centerline C of the planetary gear 2030 in the remaining phase outside the "specific phase" within the phase adjustment range as illustrated in FIG. 14. FIGS. 20A and 20B schematically illustrate the tilt toward the anti-eccentric side outside the "specific phase." In this case, the planetary gear 2030, when tilted, allows the unrecessed portion 2036a to easily make contact with the thrust bearing portion 26. The planetary gear 2030 includes recessed portion 2038 outside the anti-eccentric side with respect to rotation centerline C. The outer peripheral portion 2036 includes the unrecessed portion 2036a corresponding to the recessed portion 2038.

The tilt toward the anti-eccentric side outside the "specific phase" makes it difficult to ensure necessary tilt angle $\psi r$. However, a noise, if generated from engagement parts Gd and Gf, need not necessarily be inhibited because the noise may be blended into large sounds of the internal combustion engine in high-speed range Ah. The outer peripheral portion 2036 of the planetary gear 2030 includes the unrecessed portion 2036a corresponding to the recessed portion 2038. The unrecessed portion 2036a frequently tilts in high-speed range Ah. Abrasion at engagement parts Gd and Gf can be inhibited by positively allowing the unrecessed portion 2036a to make contact with the thrust bearing portion 26. Concerning the tilt toward the eccentric side outside the "specific phase" as schematically illustrated in the drawing, the outer peripheral portion 2036 of the planetary gear 2030 includes a corner 36a and the unrecessed portion 2036a corresponding to the recessed portion 2038. The principle comparable to the first embodiment ensures necessary tilt angle we when the corner 36a or the unrecessed portion 2036a approaches and makes contact with the thrust bearing portion 26.

Operation and Effect

The description below explains the operation and effect of the above-described second embodiment mainly regarding differences from the first embodiment.

The second embodiment allocates the "specific phase" to part of the phase adjustment range where rotational phases are adjusted. Therefore, the recessed portion 2038 allows the planetary gear 2030 to hardly make contact with the thrust bearing portion 26 in the "specific phase" as the part at the anti-eccentric side. The "specific phase" in the phase adjustment range can ensure necessary tilt angles $\psi e$ and $\psi r$ and inhibit a noise. "Outside the specific phase" in the phase adjustment range, the tilted planetary gear 30 positively makes contact with the thrust bearing portion 26 at the anti-eccentric side. This makes it possible to inhibit abrasion at engagement parts Gd and Gf due to the tilt. The second embodiment can ensure necessary tilt angle $\psi e$ and inhibit a noise even outside the "specific phase."

The second embodiment allocates the "specific phase" to part of the phase adjustment range. The planetary gear 2030 includes the recessed portion 2038 in part of the entire region in the rotational direction located at the anti-eccentric side with respect to rotation centerline C. The "specific phase" allows the planetary gear 2030 to hardly make contact with the thrust bearing portion 26 at the anti-eccentric side. Therefore, the "specific phase" can enhance the reliability of the effect of ensuring necessary tilt angles $\psi e$ and $\psi r$ and inhibiting a noise. The outside of the "specific phase" can enhance the reliability of the effect of inhibiting abrasion at engagement parts Gd and Gf by allowing the tilted planetary gear 2030 to make contact with the thrust bearing portion 26 at the anti-eccentric side.

According to the second embodiment, the revolution speed of the internal combustion engine ranges from zero to low-speed range Al in the "specific phase" as part of the phase adjustment range. Under this condition, the recessed portion 2038 allows the planetary gear 2030 to hardly make contact with the thrust bearing portion 26 at the anti-eccentric side. It is possible to ensure necessary tilt angles $\psi e$ and $\psi r$ and contribute to inhibiting a noise in low-speed range Al particularly prone to noise.

According to the second embodiment, the phase adjustment range includes the rotational phase adjusted to the outside of the "specific phase." This rotational phase changes the revolution speed of the internal combustion engine from low-speed range Al to high-speed range Ah. In this case, the planetary gear 2030 positions the recessed portion 2038 apart from the anti-eccentric side with respect to rotation centerline C. The tilted planetary gear 2030 easily makes contact with the thrust bearing portion 26 at the anti-eccentric side. It is possible to contribute to inhibiting the abrasion in high-speed range Ah particularly prone to abrasion by allowing the tilted planetary gear 2030 to positively make contact with the thrust bearing portion 26.

According to the second embodiment, the planetary gear 2030 may tilt to approach the thrust bearing portion 26 at the anti-eccentric side. In this case, the outer peripheral portion 2036 is closest to the thrust bearing portion 26 similarly to the first embodiment. The recessed portion 2038 provided in the outer peripheral portion 2036 of the planetary gear 2030 is opened toward the closest thrust bearing portion 26 in the "specific phase" as part of the phase adjustment range according to the second embodiment. The planetary gear 2030 can be regulated to make contact with the thrust bearing portion 26 at the anti-eccentric side. Therefore, it is possible to enhance the reliability of the effect of ensuring necessary tilt angles ψe and ψr and inhibiting a noise in the "specific phase."

Other Embodiments

While there have been described embodiments of the present disclosure, the disclosure should not be understood exclusively in terms of the above-mentioned embodiments but may be applicable to various embodiments and combinations within the spirit and scope of the disclosure.

Figure 22:
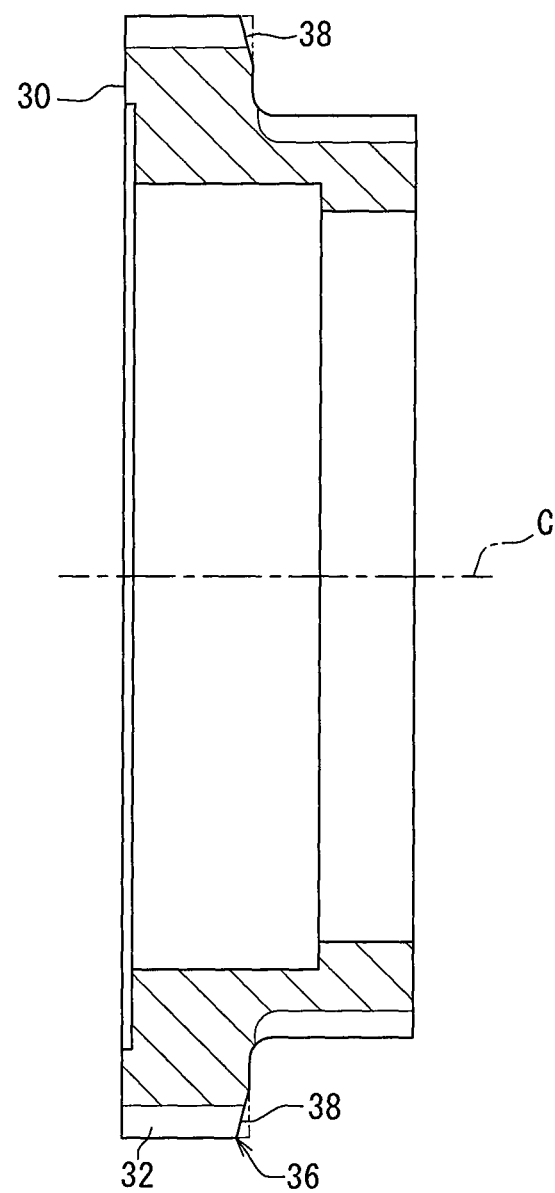
FIG. 22 is a sectional view showing a modification of FIG. 4.

Specifically, FIG. 22 illustrates a first modification of the first embodiment. The recessed portion 38 may be shaped in an annular tapered groove whose inner face is gradually concaved toward the outside in the radial direction toward the side opposite to the camshaft 2 in the axial direction. This recessed portion 38 may be formed on the outer peripheral portion 2036 of the planetary gear 30. According to a second modification of the second embodiment, the recessed portion 2038 may be shaped in a partially annular tapered groove whose inner face is gradually concaved toward the outside in the radial direction toward the side opposite to the camshaft 2 in the axial direction. This recessed portion 2038 may be formed on the outer peripheral portion 2036 of the planetary gear 30.

According to the second modification concerning the first and second embodiments, the planetary gear 30 or 2030 may be provided with the recessed portion 38 or 2038 inward from the outer peripheral portion 36 or 2036 in the radial direction. In this case of the second modification, the thrust bearing portion 26 is formed to have a shape and a size capable of entering the recessed portion 38 or 2038 of the planetary gear 30 or 2030 tilting toward the anti-eccentric side.

According to a third modification of the first embodiment, an inner diameter of the annular recessed portion 38 is described as innermost circumference radius Rc. An inner diameter of the annular thrust bearing portion 26 is described as innermost circumference radius Rb. Innermost circumference radius Rc may be larger than innermost circumference radius Rb. According to a fourth modification of the second embodiment, low-speed range Al may be defined as being higher than or equal to zero and lower than predetermined speed S. According to the fourth modification, high-speed range Ah is defined as being higher than or equal to predetermined speed S.

According to a fifth modification of the second embodiment, the rotational phase may be adjusted to the "specific phase" by use of part of revolution speeds higher than zero in low-speed range Al. According to a sixth modification of the second embodiment, the rotational phase may be adjusted to the "specific phase" by use of at least part of high-speed range Ah. The rotational phase may be adjusted outside the "specific phase" in low-speed range Al. According to a seventh modification of the second embodiment, predetermined speed S determines a boundary between low-speed range Al and high-speed range Ah. For example, predetermined speed S may be set to 2000 rpm higher than a maximum idle speed in general.

The above-described valve timing adjusting device 1 is mounted to the internal combustion engine and allows the camshaft 2 to adjust the valve timing to open and close the valve based on the torque transmitted from the crankshaft. The valve timing adjusting device 1 includes the driving rotor 10, the driven rotor 20, the single-row planetary bearing 40, the planetary gear 30 or 2030, and the planetary carrier 50. The driving rotor 10 operates in conjunction with the crankshaft and rotates about revolution centerline O. The driven rotor 20 includes the thrust bearing portion 26 around the revolution centerline common to the driving rotor. The driven rotor 20 rotates in conjunction with the coaxially connected camshaft around the revolution centerline. The single-row planetary bearing 40 is including a row of spherical rolling elements 46 interposed between the outer ring 42 and the inner ring 44. The planetary gear 30 or 2030 is supported by the thrust bearing portion and is radially supported by the outer ring to be eccentric relative to the driving rotor and the driven rotor. The planetary gear 30 or 2030 makes a planetary motion while engaging with the driving rotor and the driven rotor at the eccentric side relative to the driving rotor and the driven rotor and thereby adjusts the rotational phase between the driving rotor and the driven rotor. The planetary carrier 50 radially supports the inner ring and allows the planetary gear to make a planetary motion. The thrust bearing portion is placed to be able to support the planetary gear tilting with respect to the revolution centerline. The planetary gear includes the recessed portion 38 or 2038 opened toward the thrust bearing portion. In the rotational phase adjusted to the specific phase, the recessed portion is positioned at the anti-eccentric side opposite to the eccentric side with respect to rotation centerline C of the planetary gear.

The planetary gear tends to tilt around the tilt center point positioned at the eccentric side relative to the rotation centerline on the orbit plane with which the spherical rolling elements make rolling contact in the outer ring of the planetary bearing. As a result, the planetary gear tilts against the revolution centerline common to the driving rotor and the driven rotor provided as engagement parts at the eccentric side and is thereby supported by the thrust bearing portion of the driven rotor around the revolution centerline.

The distance between the proximate location and the tilt center point shortens when the planetary gear tilts to approach the thrust bearing portion at the eccentric side. It is possible to reduce clearances for the engagement parts and inhibit a noise even when the tilt angle causes the planetary gear to make contact with the thrust bearing portion at the eccentric side. Namely, it is possible to ensure the tilt angle (hereinafter simply referred to as a "necessary tilt angle") needed to reduce the clearances for the engagement parts and inhibit a noise.

The distance between the proximate location and the tilt center point elongates when the planetary gear tilts to approach the thrust bearing portion at the anti-eccentric side. In the specific phase according to the first embodiment, the recessed portion is positioned at the anti-eccentric side with respect to the rotation centerline of the planetary gear. The recessed portion is opened toward the thrust bearing portion. Therefore, the tilted planetary gear hardly makes contact with the thrust bearing portion at the anti-eccentric side. In this case, the planetary gear maximally tilts to be able to ensure the necessary tilt angle.

As above, the first embodiment can ensure the necessary tilt angle and inhibit a noise even when the planetary gear tilts at any side.

The recessed portion 38 or 2038 may be provided in the outer peripheral portion 36 or 2036 of the planetary gear. According to this configuration, the planetary gear may tilt to approach the thrust bearing portion at the anti-eccentric side. In this case, the outer peripheral portion is closest to the thrust bearing portion. The recessed portion provided in the outer peripheral portion of the planetary gear is opened toward the closest thrust bearing portion in the specific phase according to the second embodiment. The planetary gear can be regulated to make contact with the thrust bearing portion at the anti-eccentric side. Therefore, it is possible to enhance the reliability of the effect of ensuring the necessary tilt angle and inhibiting a noise It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The invention claimed is:

1. A valve timing adjusting device configured to be mounted to an internal combustion engine, the valve timing adjusting device configured to transmit torque from a crankshaft to a camshaft and to adjust a valve timing at which the camshaft opens and closes a valve, the valve timing adjusting device comprising:
   a driving rotor configured to rotate about a revolution centerline in conjunction with the crankshaft;
   a driven rotor coaxially connected with the camshaft and configured to rotate about the revolution centerline in conjunction with the camshaft, the driven rotor including a thrust bearing portion around a revolution centerline that is common to the revolution centerline of the driving rotor;
   a single-row planetary bearing including an outer ring, an inner ring, and a single row of spherical rolling elements interposed between the outer ring and the inner ring;
   a planetary gear supported by the thrust bearing portion and radially supported by the outer ring to be eccentric relative to the driving rotor and the driven rotor, the planetary gear configured to perform a planetary motion while engaging with the driving rotor and the driven rotor at an eccentric side relative to the driving rotor and the driven rotor to adjust a rotational phase between the driving rotor and the driven rotor; and
   a planetary carrier radially supporting the inner ring and configured to allow the planetary gear to perform the planetary motion, wherein
   the thrust bearing portion is configured to support the planetary gear that is tilting with respect to the revolution centerline of the driving rotor,
   the planetary gear has a recessed portion opened toward the thrust bearing portion,
   when the rotational phase is adjusted to a specific phase, the recessed portion is positioned at an anti-eccentric side opposite to the eccentric side with respect to a rotation centerline of the planetary gear,
   the specific phase is an entirety of a phase adjustment range in which the rotational phase is to be adjusted,
   the thrust bearing portion is in an annular form continually extending in an entire region of the driven rotor in a rotational direction,
   the recessed portion is in an annular form continually extending in an entire region of an outer peripheral portion of the planetary gear in a rotational direction, and
   an inner diameter of the recessed portion is smaller than an inner diameter of the thrust bearing portion.

2. The valve timing adjusting device according to claim 1, wherein
   the recessed portion is continuously defined in an entire region of the planetary gear in a rotational direction.

3. The valve timing adjusting device according to claim 1, wherein
   the specific phase is in a part of a phase adjustment range in which the rotational phase is to be adjusted.

4. The valve timing adjusting device according to claim 3, wherein
   the recessed portion is defined in a part of an entire region of the planetary gear in a rotational direction that is to be positioned at the anti-eccentric side with respect to the rotation centerline when the rotational phase is adjusted to the specific phase.

5. The valve timing adjusting device according to claim 3, wherein
   the specific phase is in a part of the phase adjustment range in which a revolution speed of the internal combustion engine belongs to an extent from a zero speed to a low-speed range.

6. The valve timing adjusting device according to claim 1, wherein
   the recessed portion is defined in an outer peripheral portion of the planetary gear.

7. The valve timing adjusting device according to claim 1, wherein
   the recessed portion is dented in a direction opposite to the camshaft along the revolution centerline of the driven rotor.

* * * * *